United States Patent
Nakazawa et al.

(10) Patent No.: US 9,008,489 B2
(45) Date of Patent: Apr. 14, 2015

(54) KEYWORD-TAGGING OF SCENES OF INTEREST WITHIN VIDEO CONTENT

(71) Applicants: Masami Nakazawa, Saitama (JP); Keiichiro Hoashi, Saitama (JP); Chihiro Ono, Saitama (JP)

(72) Inventors: Masami Nakazawa, Saitama (JP); Keiichiro Hoashi, Saitama (JP); Chihiro Ono, Saitama (JP)

(73) Assignee: KDDI Corporation, Tokyo (JP)

( * ) Notice: Subject to any disclaimer, the term of this patent is extended or adjusted under 35 U.S.C. 154(b) by 178 days.

(21) Appl. No.: 13/770,272

(22) Filed: Feb. 19, 2013

(65) Prior Publication Data

US 2013/0216203 A1     Aug. 22, 2013

Related U.S. Application Data

(60) Provisional application No. 61/600,214, filed on Feb. 17, 2012.

(51) Int. Cl.
| | |
|---|---|
| H04N 9/80 | (2006.01) |
| H04N 7/16 | (2011.01) |
| H04N 9/79 | (2006.01) |
| H04N 21/25 | (2011.01) |
| H04N 21/414 | (2011.01) |
| H04N 21/4788 | (2011.01) |

(Continued)

(52) U.S. Cl.
CPC .............. *H04N 9/79* (2013.01); *H04N 21/252* (2013.01); *H04N 21/41407* (2013.01); *H04N 21/4312* (2013.01); *H04N 21/4316* (2013.01); *H04N 21/47217* (2013.01); *H04N 21/4788* (2013.01); *H04N 21/488* (2013.01); *H04N 21/8133* (2013.01); *H04N 21/8456* (2013.01); *H04N 21/8547* (2013.01); *H04N 21/8549* (2013.01)

(58) Field of Classification Search
USPC .................................................. 386/239-248
See application file for complete search history.

(56) References Cited

U.S. PATENT DOCUMENTS

| 8,812,498 B2 * | 8/2014 | Ingrassia et al. .............. 707/732 |
| 2002/0120925 A1 * | 8/2002 | Logan ................................ 725/9 |

(Continued)

FOREIGN PATENT DOCUMENTS

| JP | A-2007-172173 | 7/2007 |
| JP | A-2008-242838 | 10/2008 |

(Continued)

OTHER PUBLICATIONS

Zhong et al., "Clustering Methods for Video Browsing and Annotation", Proceedings of the SPIE, vol. 2670, p. 239-246, Mar. 1996.*

(Continued)

*Primary Examiner* — Hung Dang
(74) *Attorney, Agent, or Firm* — Oliff PLC

(57) ABSTRACT

Extraction of scenes of interest from video content is disclosed, which includes: collecting comments from a comment server, which contain keywords associated with the video content; segmenting the video content into scenes; measuring the number of ones of the comments which were posted for each scene, as a post count; detecting ones of the scenes, each of which has the post count equal to or larger than a predetermined number, as a plurality of scenes of interest; extracting, per each scene-of-interest, at least one of the keywords which is contained in the comments with a number equal to or larger than a pre-selected number, as a comment keyword; and tagging each scene of interest with the comment keyword, per each scene-of-interest.

18 Claims, 16 Drawing Sheets

(51) Int. Cl.

| | | |
|---|---|---|
| *H04N 21/488* | (2011.01) | |
| *H04N 21/81* | (2011.01) | |
| *H04N 21/845* | (2011.01) | |
| *H04N 21/8547* | (2011.01) | |
| *H04N 21/8549* | (2011.01) | |
| *H04N 21/431* | (2011.01) | |
| *H04N 21/472* | (2011.01) | |

(56) References Cited

U.S. PATENT DOCUMENTS

| | | | |
|---|---|---|---|
| 2004/0034660 A1* | 2/2004 | Chen et al. | 707/104.1 |
| 2005/0004900 A1* | 1/2005 | Ohta et al. | 707/3 |
| 2006/0106604 A1* | 5/2006 | Okimoto | 704/243 |
| 2008/0077658 A1* | 3/2008 | Kojima | 709/203 |
| 2008/0126191 A1* | 5/2008 | Schiavi | 705/14 |
| 2009/0164904 A1* | 6/2009 | Horowitz et al. | 715/723 |
| 2009/0319885 A1* | 12/2009 | Amento et al. | 715/230 |
| 2010/0122309 A1* | 5/2010 | Kawakami et al. | 725/116 |
| 2011/0004624 A1* | 1/2011 | Bansal et al. | 707/776 |
| 2011/0150427 A1* | 6/2011 | Kohno | 386/262 |
| 2012/0036080 A1* | 2/2012 | Singer et al. | 705/319 |

FOREIGN PATENT DOCUMENTS

| | | |
|---|---|---|
| JP | A-2008-278088 | 11/2008 |
| JP | A-2010-4309 | 1/2010 |

OTHER PUBLICATIONS

Saber et al, "Region-Based Shape Matching for Automatic Image Annotation and Query-by-Example", Mar. 1997.*

Yang et al., "Region-based Image Annotation using Asymmtrical Support Vector Machine-based Multiple-Instance Learning", Proceedings of the 2006 IEEE Computer Society Conference on Computer Vision and pattern Recognition (CVPR06), 2006.*

Wang et al., "Columbia TAG System—Transductive Annotation by Graph Version 1.0", Columbia University ADVENT Technical Report #225-2008-3, Oct. 15, 2008.*

Shamma et al., "Tweet the Debates," *Proc WSM*, Oct. 23, 2009, pp. 3-10, Beijing, China.

Hanjalic, "Adaptive Extraction of Highlights From a Sport Video Based on Excitement Modeling," *IEEE Transactions of Multimedia*, Dec. 2005, pp. 1114-1122, vol. 7, No. 6, IEEE.

Sep. 2, 2014 Office Action issued in Japanese Application No. 2011-086785 (with partial translation).

Saito, Y et al. "Researches Towards Audience-oriented Internet Broadcasting." *Technical Report of Information Processing Society of Japan*, Mar. 15, 2010, pp. 1-6, vol. 2010-GN-74, No. 19 (with abstract).

* cited by examiner

KEYWORD-TAGGING OF SCENES OF INTEREST WITHIN VIDEO CONTENT

CROSS-REFERENCE TO RELATED APPLICATIONS

This application claims priority to U.S. Provisional Application No. 61/600,214 filed 17 Feb. 2012 entitled "KEYWORD-TAGGING OF SCENES OF INTEREST WITHIN VIDEO CONTENT," which is hereby incorporated herein by reference in its entirety.

This application is related to Japanese Patent Application Nos. 2011-002513 filed 7 Jan. 2011 and 2011-086785 filed 5 Apr. 2011, each of which is hereby incorporated herein by reference in its entirety.

BACKGROUND OF THE INVENTION

1. Technical Field

The invention relates to techniques of performing extraction of scenes of interest from video or motion-picture content such as TV broadcast content or content from a video sharing website, from a user's viewpoint.

2. Description of the Related Art

In recent years, a variety of pieces of video content have been delivered to a large audience via TV broadcasting or the Internet. Such video content is any type of media content such as TV broadcast content or content from a video sharing website.

For example, in the case of TV broadcast content, the TV broadcast content contains not only audio/video information representative of a broadcast program, but also caption or subtitle teletext-information appearing in synchronization with the audio/video information. The caption teletext-information is typically a short text message of a summary of the broadcast program, and the message contains keywords that represent the audio/video information appropriately. The caption teletext-information is provided by a content provider.

In addition, a large audience is actively posting their comments to a website such as a blog (web log) or a mini blog (mini web log) (e.g., Twitter (Registered Trademark)) via the Internet. These comments are characterized in that they share the same topic for discussion. The shared topic includes video content delivered to the large audience as described above.

While many users are viewing video content, for example, they can discuss the video content that is being broadcast, via a mini blog or the like. In recent years, such a viewing habit has become more popular that, while viewing TV broadcast content (e.g., a drama), for example, users post their comments on the TV broadcast content, via a mini blog. This makes many users to feel that they are viewing one piece of video content as a shared content.

In addition, it is possible to extract keywords that interest many viewers of the same piece of TV broadcast content, from comments that those viewers have posted to a blog site, resulting in collection of comments. Those keywords are, for example, hash tags in the case of Twitter, for example.

It is noted that there is a conventional technique of detecting scenes of interest (peaks) based on the number of comments posted (i.e., the number of tweets, in the case of Twitter), and partitioning video content (see Non-patent Literature No. 1: David A. Shamma, Lyndon Kennedy, and Elizabeth F. Churchill, "Tweet the Debates," Proc WSM '09, Oct. 23, 2009, for example) into segments. This technique allows estimation of the content of each one of scene segments, from its number of tweets.

This technique of Non-patent Literature No. 1 applies to a discussion event such as a debate. For example, a hypothetical event is considered in which, in video content, opinion of a first leader is followed by opinion of a second leader. In this event, the audience continues posting their first comments on the first leader's opinion even when the second leader is presenting her or his opinion. Non-patent Literature No. 1 is for correcting a temporal deviation (temporal difference) between when each scene of the video content appears and when the associated posts are counted.

From a different standpoint, there are also many cases where some viewers cannot view TV broadcast content, for example, in realtime, but they need to view only scenes of interest by scene extraction. Video content is content that is to be viewed in a time-sequential manner, and abbreviated content provided by extracting only scenes of interest from the video content is delivered by a content provider. In contrast, there is also a technique of extracting highlights using an image-feature-based approach (see Non-patent Literature No. 2: Alan Hanjalic, "Adaptive Extraction of Highlights From a Sport Video Based on Excitement Modeling," IEEE Transactions on Multimedia, Vol. 7, No. 6, December 2005, for example). This technique allows highlights extraction by analysis of features of motion pictures themselves of a TV program.

BRIEF SUMMARY OF THE INVENTION

However, it is desirable that scenes of interest be selected based on a user's viewpoint in every possible case. In addition, tagging scenes of interest with comment keywords based on a user's viewpoint promotes the user's understanding while viewing. Additionally, the use of such comment keywords enables the user to search for scenes of interest, to thereby allow the user to view various scenes of interest. It is added that the technique of Non-patent Literature No. 2 allows analytical processing for image-feature extraction with a vast number of computational operations, which cannot extend to calculation for estimating the content of the motion pictures themselves.

Therefore, it is desirable to tag scenes of interest that are selected from video content broadcast sequentially, from a user's viewpoint, to indicate the content of the video content.

According to the present invention, the following modes are provided. These modes will be stated below such that these modes are divided into sections and are numbered, and such that these modes depend upon other mode(s), where appropriate. This facilitates a better understanding of some of the plurality of technical features and the plurality of combinations thereof disclosed in this specification, and does not mean that the scope of these features and combinations should be interpreted to limit the scope of the following modes of the invention. That is to say, it should be interpreted that it is allowable to select the technical features, which are stated in this specification but which are not stated in the following modes, as technical features of the invention.

Furthermore, reciting herein each one of the selected modes of the invention in a dependent form so as to depend from the other mode(s) does not exclude the possibility of the technical features in the dependent-form mode from becoming independent of those in the corresponding dependent mode(s) and to be removed therefrom. It should be interpreted that the technical features in the dependent-form mode(s) may become independent according to the nature of the corresponding technical features, where appropriate.

(1) A method for use in a device of receiving video content to be published, of extracting scenes of interest from the video content, the method comprising:

a comment collection step of collecting a plurality of comments with posting timestamps indicating times at which the comments were posted, from a comment server, the comments containing keywords associated with the video content;

a post counting step of segmenting the video content into a plurality of scenes each having a predetermined time duration, and of measuring a number of ones of the plurality of comments which were posted during a time zone of each scene, as a post count;

a scene-of-interest detection step of detecting ones of the plurality of scenes, each of which has the post count equal to or larger than a predetermined number, as a plurality of scenes of interest;

a comment-keyword extraction step of extracting, per each scene-of-interest, at least one of the keywords which is contained in the plurality of comments with a number equal to or larger than a pre-selected number, as a comment keyword; and a comment-tagging step of tagging each scene of interest with the comment keyword, per each scene-of-interest.

(2) The method according to mode (1), wherein the comment-keyword extraction step comprises a sub-step of extracting, per each scene-of-interest, words from the plurality of comments, by morphological analysis, and of extracting distinctive words, per each scene-of-interest, using TF-TDF (Term Frequency-Inverse Document Frequency), as the comment keyword.

(3) The method according to mode (2), wherein the comment-keyword extraction step comprises:

a sub-step of extracting, per each scene-of-interest, a part-of-speech of a "person's name" among the distinctive words, by the morphological analysis; and a sub-step of extracting, per each scene-of-interest, an important word having the largest score of the TF-IDF among the distinctive words, by the morphological analysis, and the comment-tagging step comprises a sub-step of tagging each scene-of-interest with the comment keyword in the form of the part-of-speech of the "person's name" and the important word, per each scene-of-interest.

(4) The method according to any one of modes (1)-(3), wherein scene-of-interest detection step comprises:

a sub-step of calculating, per each scene, an average μ and a standard deviation σ for the post count; and a sub-step of extracting each scene as the scene of interest if the each scene has the post count equal to or larger than a sum of the average μ and the standard deviation σ.

(5) The method according to any one of modes (1)-(4), further comprising an abbreviated-content generation step of generating abbreviated content representative of an abbreviated version of the video content, by combining at least some of the scenes of interest.

(6) The method according to any one of modes (1)-(5), further comprising:

a post-count graph generation step of generating a post-count graph representative of a time-varying number of the posts, such that the post-count graph is tagged with the comment keywords at selected points in time, by referencing a scene-of-interest storage storing the scenes of interest; and a post-count graph transmission step of transmitting the post-count graph to a viewer's terminal equipment allowing the viewer to view the video content.

(7) The method according to mode (6), further comprising a requested-keyword reception step of receiving a requested keyword from the terminal equipment, wherein the post-count graph generation step comprises a sub-step of tagging the post-count graph with ones of the comment keywords which contain the requested keyword.

(8) The method according to mode (7), wherein the post-count graph generation step comprises a sub-step of generating a post-count graph representative of only numbers of ones of the plurality of comments which contain the requested keyword.

(9) The method according to any one of modes (6)-(8), further comprising a scene-of-interest transmission step of transmitting to the terminal equipment only ones of the scenes of interest which are tagged with the requested keyword.

(10) The method according to any one of modes (6)-(9), further comprising a comment transmission step of transmitting to the terminal equipment ones of the plurality of comments which correspond to ones of the scenes of interest which are tagged with the requested keyword received from the terminal equipment.

(11) The method according to any one of modes (6)-(10), wherein the post-count graph generation step comprises:

a sub-step of calculating a ratio (number of users posted/total post count) of a number of users who posted the plurality of comments, to a total number of the plurality of comments, for ones of the scenes of interest which are tagged with the comment keywords on the post-count graph; and a sub-step of displaying the comment keywords with which the scenes of interest are tagged, such that each comment keyword is visually emphasized at an increasing emphasis level as the ratio of the associated one of the tagged scenes of interest increases.

(12) The method according to any one of modes (6)-(10), wherein the post-count graph generation step comprises:

a sub-step of calculating a ratio (number of quotations/total post count) of a number of ones of the plurality comments which have quotation, to a total number of the plurality of comments, for ones of the scenes of interest which are tagged with the comment keywords on the post-count graph; and a sub-step of displaying the comment keywords with which the scenes of interest are tagged, such that each comment keyword is visually emphasized at an increasing emphasis level as the ratio of the associated one of the tagged scenes of interest increases.

(13) The method according to any one of modes (6)-(12), wherein the video content includes at least one of TV broadcast content and content from a video sharing website, and the comment server includes a mini blog (mini Web log) server.

(14) The method according to mode (13), wherein the mini blog server is a Twitter (Registered Trademark) server, and the comment collection step comprises a sub-step of collecting the plurality of comments containing hash tags based on the video content, from the Twitter server.

(15) A server for receiving video content to be published, and extracting scenes of interest from the video content, comprising:

a collector that collects a plurality of comments with posting timestamps indicating times at which the comments were posted, from a comment server, the comments containing keywords associated with the video content;

a post counter that segments the video content into a plurality of scenes each having a predetermined time duration, and measures a number of ones of the plurality of comments which were posted during a time zone of each scene, as a post count;

a scene-of-interest detector that detects ones of the plurality of scenes, each of which has the post count equal to or larger than a predetermined number, as a plurality of scenes of interest;

a comment-keyword extractor that extracts, per each scene-of-interest, at least one of the keywords which is contained in the plurality of comments with a number equal to or larger than a pre-selected number, as a comment keyword;

a comment tagger that tags each scene of interest with the comment keyword, per each scene-of-interest; and a scene-of-interest delivery unit that delivers the tagged scenes of interest, upon reception of a request from a viewer's terminal equipment allowing the viewer to view the video content.

(16) Terminal equipment in connection with a network, comprising:

a video-content receiver that receives video content to be published;

a collector collects a plurality of comments with posting timestamps indicating times at which the comments were posted, from a comment server, the comments containing keywords associated with the video content;

a post counter that segments the video content into a plurality of scenes each having a predetermined time duration, and measures a number of ones of the plurality of comments which were posted during a time zone of each scene, as a post count;

a scene-of-interest detector that detects ones of the plurality of scenes, each of which has the post count equal to or larger than a predetermined number, as a plurality of scenes of interest;

a comment-keyword extractor that extracts, per each scene-of-interest, at least one of the keywords which is contained in the plurality of comments with a number equal to or larger than a pre-selected number, as a comment keyword; and a comment tagger that tags each scene of interest with the comment keyword, per each scene-of-interest.

(17) A non-transitory storage medium having stored a program executed by a computer for implementing a method for use in a device of receiving video content to be published, of extracting scenes of interest from the video content, the method comprising:

a comment collection step of collecting a plurality of comments with posting timestamps indicating times at which the comments were posted, from a comment server, the comments containing keywords associated with the video content;

a post counting step of segmenting the video content into a plurality of scenes each having a predetermined time duration, and of measuring a number of ones of the plurality of comments, which were posted during a time zone of each scene, as a post count;

a scene-of-interest detection step of detecting ones of the plurality of scenes, each of which has the post count equal to or larger than a predetermined number, as a plurality of scenes of interest;

a comment-keyword extraction step of extracting, per each scene-of-interest, at least one of the keywords which is contained in the plurality of comments with a number equal to or larger than a pre-selected number, as a comment keyword; and a comment-tagging step of tagging each scene of interest with the comment keyword, per each scene-of-interest.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Some of the more specific embodiments of the invention will be described in the following in more detail with reference to the drawings in which like numerals are used to indicate like elements throughout.

Figure 1:
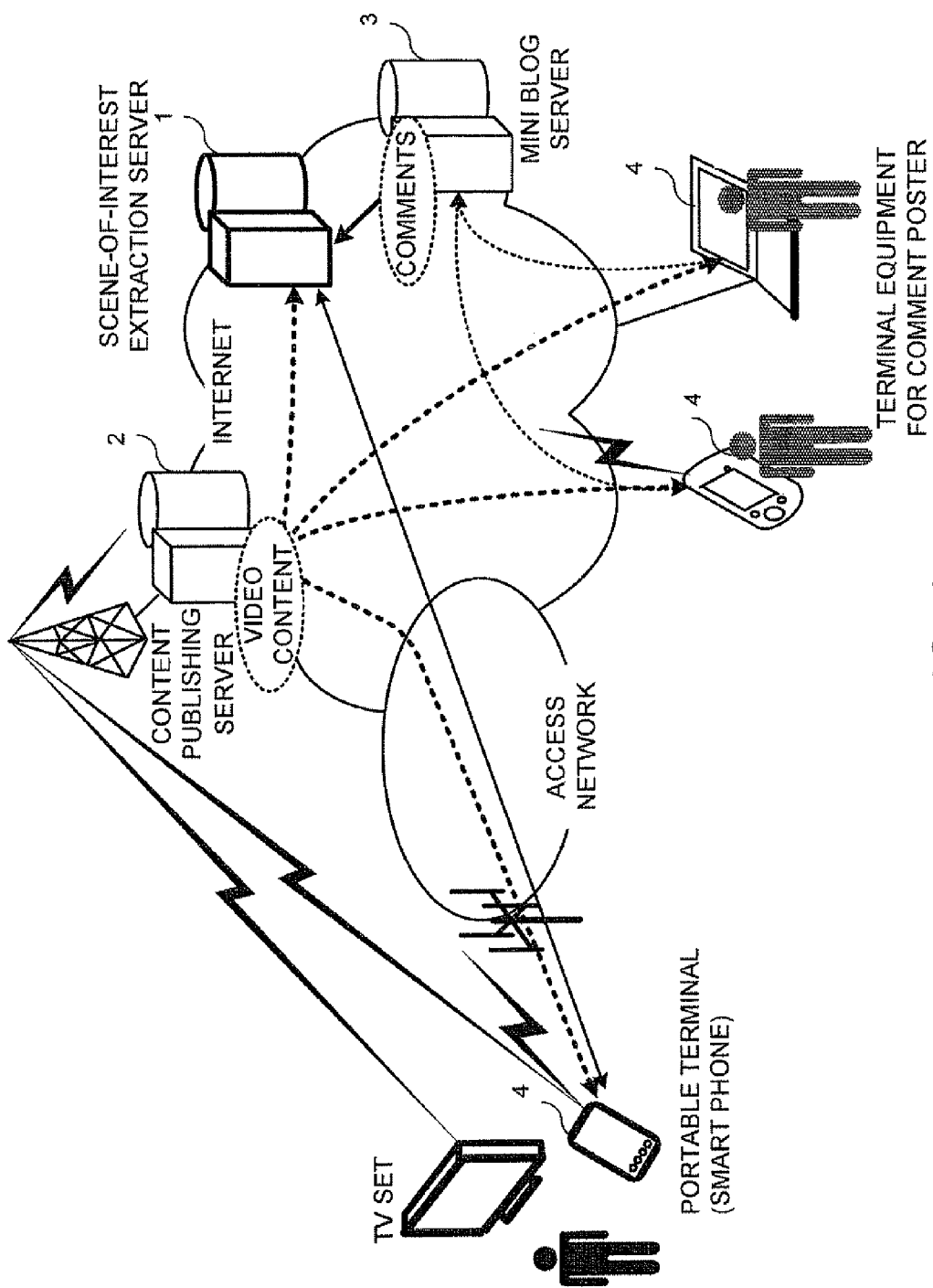
FIG. 1 is a view illustrative of the configuration of a system constructed according to an illustrative embodiment of the invention.

FIG. 1 is a view illustrative of the configuration of a system constructed according to an illustrative embodiment of the invention.

As illustrated in FIG. 1, a content publishing server 2 delivers video content to a large number of viewers over the air or the Internet. The video content may be, for example, TV broadcast content or content from a video sharing website. TV broadcast content, which is broadcast over the air, is delivered by terrestrial digital broadcasting, one-segment broadcasting, BS (Broadcast Satellite), etc. In addition, content from a video sharing website, which is broadcast over the Internet, is delivered by live video streaming based on, for example, Upstream (Registered Trademark).

Terminal equipment 4 receives video content delivered from the content publishing server 2, over the air or the Internet, and plays it back. A user can view video content played back by the terminal equipment 4. The terminal equipment 4 may be a TV set, a mobile phone, a smart phone, etc. The terminal equipment 4 may receive video content through a set top box that receives broadcasting waves, or through a router that is connected with an access network. It is added that the terminal equipment 4 will be described below as a mobile terminal such as a smart phone.

As illustrated in FIG. 1, a mini blog server 3 serving as a comment server is connected with the Internet. The mini blog server 3 is, for example, a Twitter website server. A large number of viewers can each post comments to the mini blog server 3, while viewing video content through the terminal equipment 4. In addition, each user can view comments that other posted to the mini blog server 3, without permission.

In an example, these comments are written in Japanese language in which word boundaries are not indicated by blank spaces.

In addition, as illustrated in FIG. 1, a scene-of-interest extraction server 1, which is a part of the present embodiment, is also connected with the Internet. The scene-of-interest extraction server 1 receives video content from the content publishing server 2, and collects comments associated with the video content from the mini blog server 3. The scene-of-interest extraction server 1 extracts scenes of interest in the video content, based on the comments posted in association with the video content. And the scenes of interest can be tagged to indicate the content of the associated comment. The scene-of-interest extraction server 1 delivers scenes of interest in the video content, in response to reception of a request from the terminal equipment 4.

Figure 2:
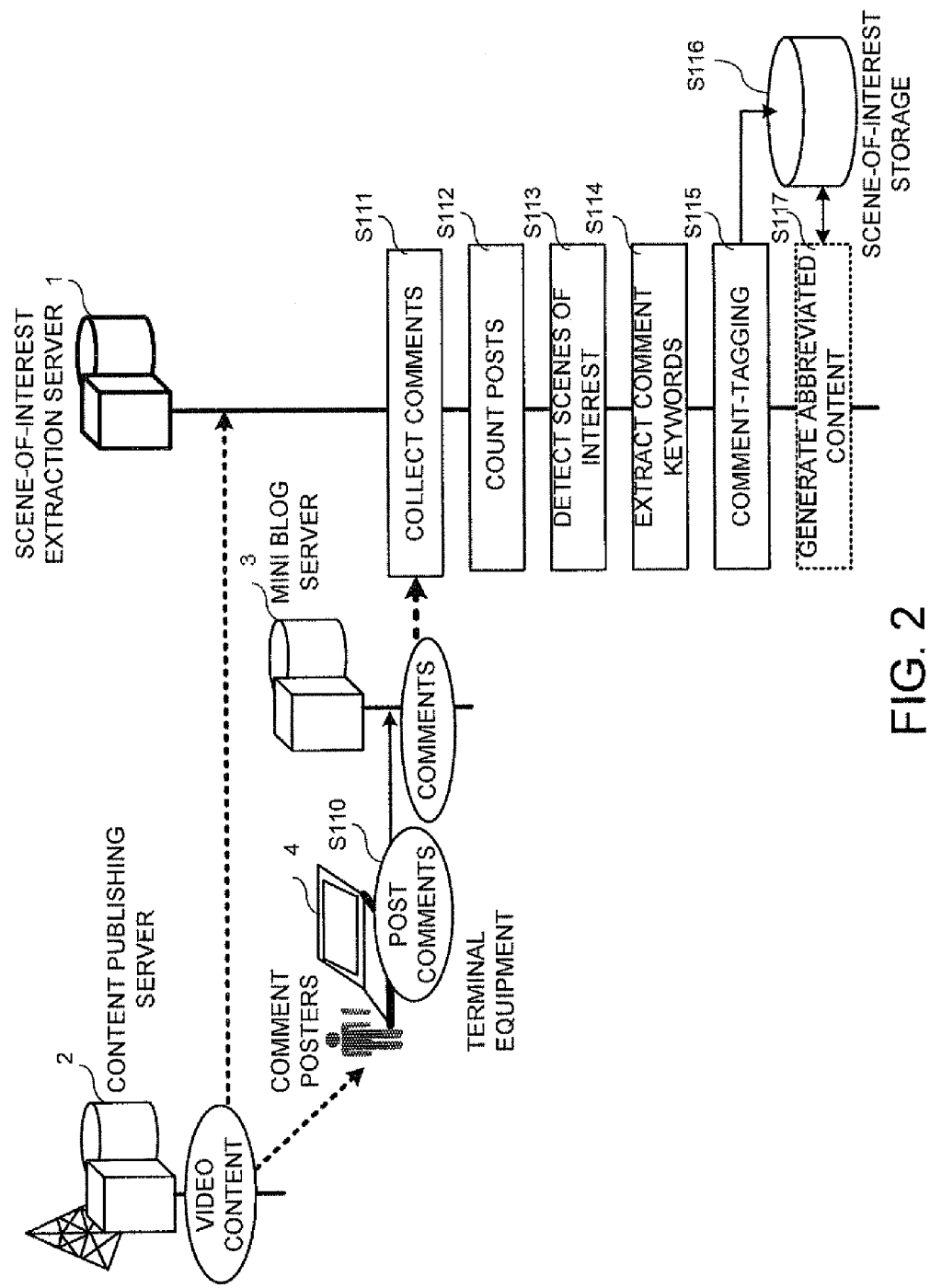
FIG. 2 is a sequence diagram according to the present embodiment.

FIG. 2 is a sequence diagram of a system according to the present embodiment.

The content publishing server 2 delivers video content toward a large number of viewers. Sets of the terminal equipment 4, which are held by the large number of viewers, play back the video content on a display 40 (see FIG. 8), which has been received by the terminal equipment 4 over the air or the Internet.

(S110) A user who is viewing the video content can post a plurality of comments associated with the video content, via the terminal equipment 4 to the mini blog server 3. The mini blog server 3 stores the plurality of comments received by the mini blog server 3, and publishes the plurality of comments to a large number of viewers.

(S111) The scene-of-interest extraction server 1 collects a plurality of comments associated with the video content from the mini blog server 3. A plurality of comments containing "keywords" associated with the video content are collected from a comment server, in combination with their posting timestamps indicating times at which the plurality of comments were posted. In an example of a Twitter website server, a plurality of comments (i.e., tweets) containing a designated keyword can be retrieved. For example, to search for tweets containing a keyword "tigers," the following URL (Uniform Resource Locator) is designated:

http://search.twitter.com/search.atom?phrase=tigers.

In addition, when Twitter is used, for collection of a plurality of comments associated with video content, only comments with an added hash tag (the symbol "#" and a string of alphabetical characters) associated with the video content can be collected. When Twitter is used, the use of a hash tag allows topics to be shared, which can cluster comments with the addition of the same hash tag. For example, to search for tweets with an added hash tag "#tigers," the following URL is designated:

http://search.twitter.com/search.atom?q=%23tigers.

In addition, the designation of a date allows search for up-to-one-week's worth of tweets. Documentation of the Twitter API (Application Programming Interface) is known.

(S112) The video content is segmented into a plurality of scenes each having a predetermined time duration, and the number of ones of the plurality of comments which were posted during a time zone of each scene, is measured as a post count. In an example, post counts are measured at time intervals of 2 minutes.

Figure 3:
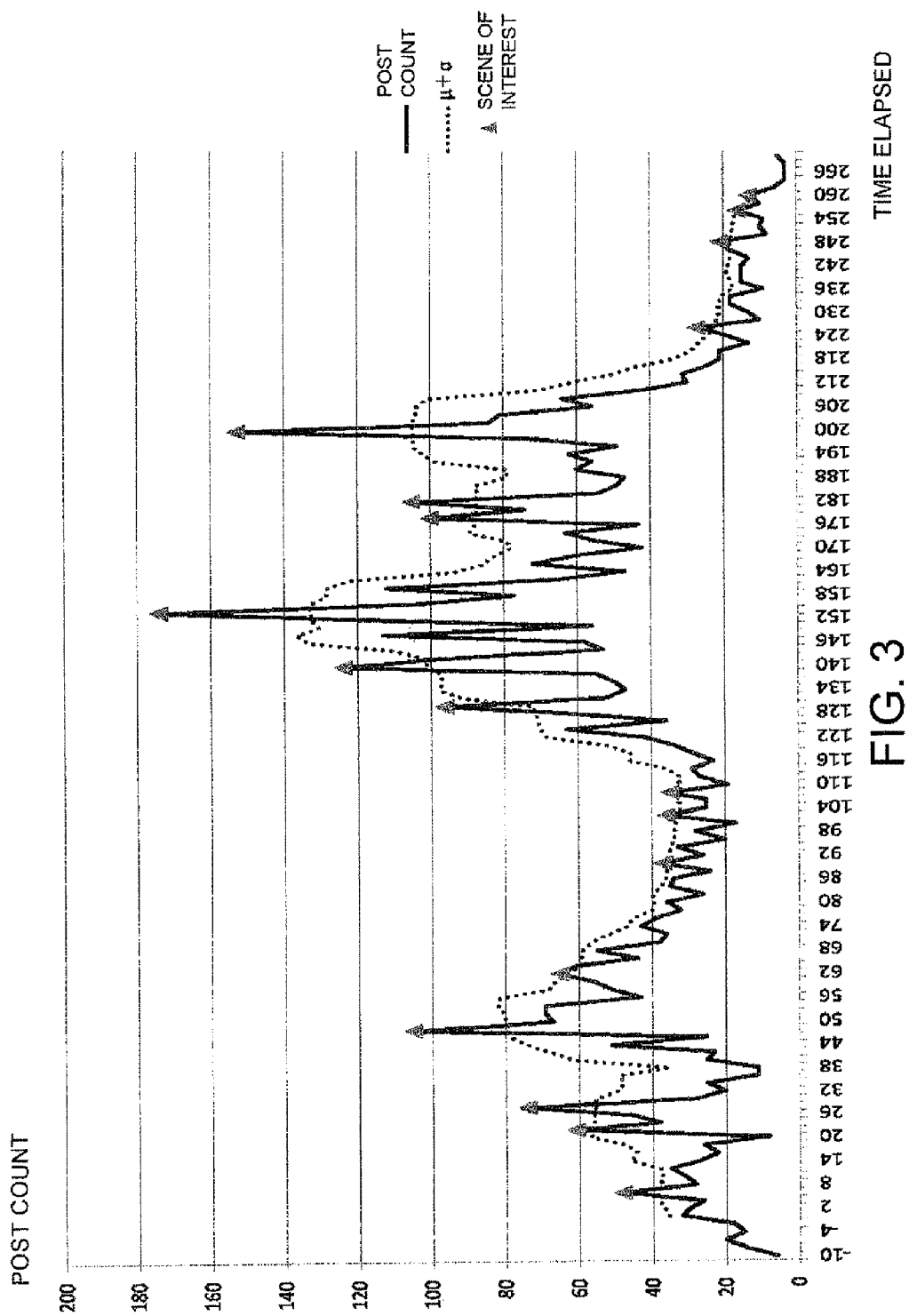
FIG. 3 is a graph representative of a time-varying number of posts.

FIG. 3 is a graph representative of a time-varying postcount. As illustrated in FIG. 3, the post counts are depicted at time intervals of 2 minutes on the graph.

(S113) Next, ones of the plurality of comments, each of which has the post count equal to or larger than a predetermined number are extracted as a plurality of scenes of interest. Not only scenes exceeding the predetermined number, increasingly exciting scenes with a rapid increase in the post count can be also detected. For detection of such scenes of interest, the Newton method known as a gradient method can be desirably used. The "Newton-Raphson method" is used to solve an approximated value of the point of intersection of a function f(x) with an x axis (x-intercept) by iterative calculation.

In a more specific implementation, an average $\mu$ and a standard deviation a of a post count are desirably used for each of the scenes (e.g., occurring at time intervals of 2 minutes).

The average $\mu$ is a mean value calculated for each of the scenes (e.g., occurring at time intervals of 2 minutes, in an example) within a predetermined time-window (e.g., with a 10-muniute-long duration, in the example) (smoothing). For example, the average $\mu$ is calculated by dividing the number of posts collected for one time window, by the number of scenes belonging to the one time window (e.g., five in the above example), and the calculated average $\mu$ is kept constant between the scenes belonging to the one time window.

The standard deviation $\sigma$ is referred to the square root of the dispersion of posts for each scene. The dispersion is referred to the "square of differences between the actual post-counts and the average of the post counts," which represents how spread out a distribution of the actual post-counts. The standard deviation $\sigma$ can vary between the scenes belonging to the one time window. And if, per each of the scenes, "the post count is equal to or larger than the sum of the average p and the standard deviation $\sigma$," the each scene is extracted as a scene of interest that is determined by reference to post-counts, as an exciting scene.

As illustrated in FIG. 3, on the graph, a dotted line represents the "sum of average $\mu$ and standard deviation $\sigma$." Fractions of the post counts which are above the dotted line are illustrated with Δ, each of which indicates a scene of interest or an exciting scene.

(S114) Next, comment keywords are extracted which are contained in a plurality of comments with a number equal to or larger than a predetermined number, per each scene of interest. In this implementation, a plurality of words are extracted from the plurality of comments by morphological analysis. The "morphological analysis" is referred to a method of segmenting a text into words each having semantic meaning, and determining the part-of-speech and the content of each word using a dictionary. The "morpheme" is referred to the smallest linguistic unit that has semantic meaning, among a plurality of units forming a text.

In this regard, the morphological analysis may be performed using, for example, open source morphological analyzer engine "MeCab." This engine, which uses a hierarchy of parts of speech, also allows analysis of parts of speech of morphemes. This has the function called "word-segmentation by software" that can generate any possible morpheme stings of an inputted sentence, with marginal probabilities. As a result, this determines parts of speech, such as, "noun," "unique noun," "organization," "district," "general," . . . , etc., per each morpheme.

In this regard, in the present embodiment, it is also desirable to perform extraction for the part of speech of "person's name," which is one of distinctive words, by the morphological analysis. Within a scene, a "person's name" is the most exemplary among distinctive words.

Then, distinctive words are extracted as comment keywords by TF-IDF (Term Frequency-Inverse Document Frequency). The TF-IDF is referred to a method of representing a document with a query by giving a weight to each word, and ranking the document by a similarity score between the document and the query. It is recognized that the larger the score by the ranking, the more likely the word is to be important. In other words, what video content is like is appropriately represented by frequencies of keywords appearing in a document.

Per each scene-of-interest, an important word having the largest score of the TF-IDF among the distinctive words is extracted by the morphological analysis. In this regard, it is desirable to extract at least (1) distinctive words featured by a part-of-speech of "person's name" by the morphological analysis, and (2) other distinctive words.

(S115) Then, each scene-of-interest is tagged with words featured by a part-of-speech of "person's name" and other distinctive words, each serving as a comment keyword, per each scene-of-interest. This allows each scene-of-interest to be tagged with "key character" and "important words," per each scene-of-interest, which makes it easier to understand scenes that excite a user.

(S116) A plurality of scenes of interest, which have been tagged with comment keywords, are stored in a scene-of-interest storage. The comment keywords that the plurality of scenes of interest have been tagged with are used not only for the user's understanding but also as search keys used for searching the scene-of-interest storage.

(S117) Optionally, abbreviated content representative of an abbreviated version of the video content is generated by combining a sub-plurality of scenes of interest. Video content featured by the graph of FIG. 3 is 260 minutes (4 hours and 20 minutes) long, while 36-minute long abbreviated content is generated by combining only 18 scenes of interest.

The scene-of-interest extraction server 1 transmits scenes of interest in particular video content, in response to reception of a request from the terminal equipment 4 by the user's operation. This allows the user to view only desired scenes of interest using the terminal equipment 4. The scene-of-interest extraction server 1 searches the scene-of-interest storage, in response to reception of a requested keyword from the terminal equipment 4, and transmits associated ones of the scenes of interest to the terminal equipment 4.

Figure 4:
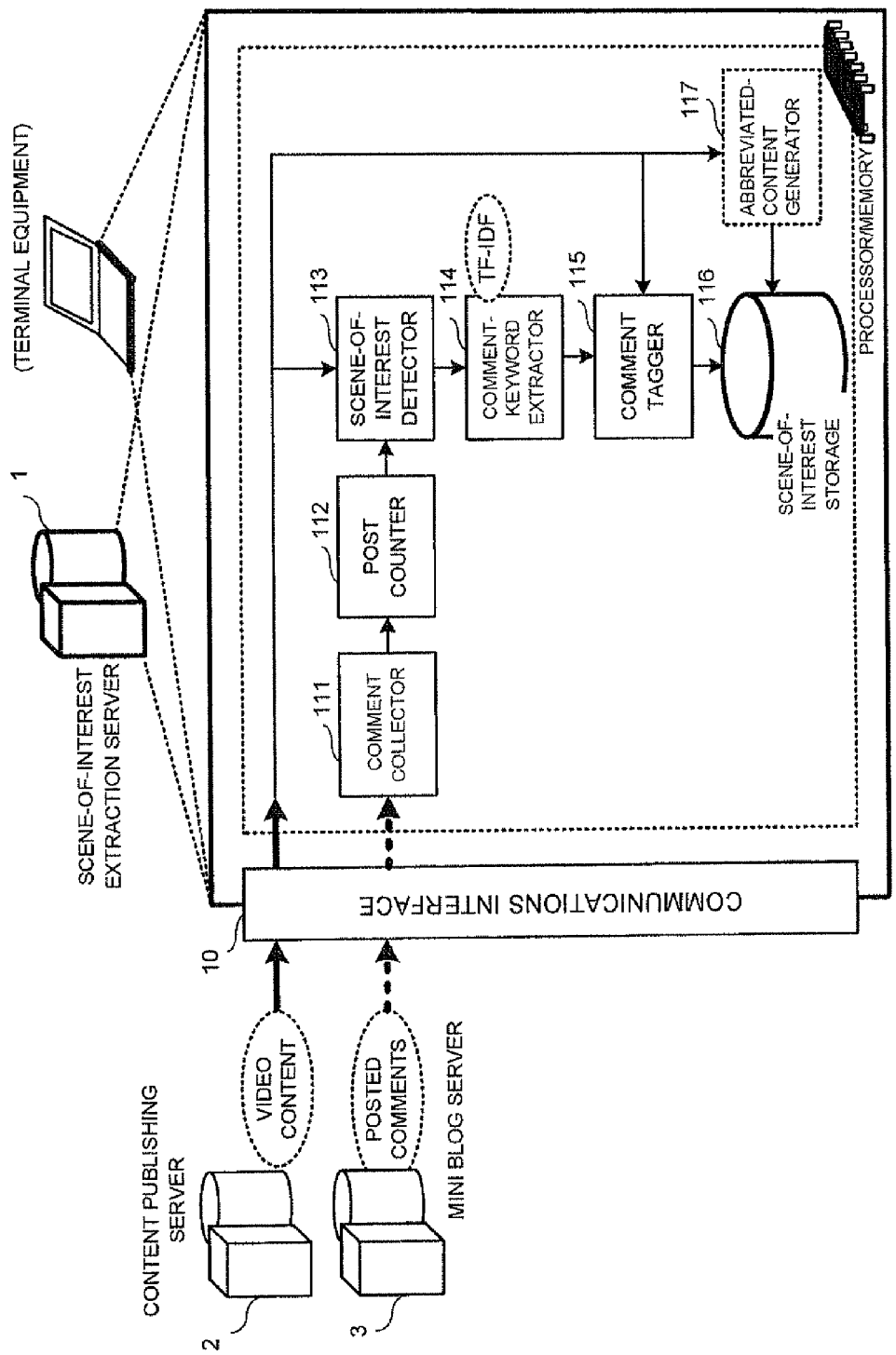
FIG. 4 is a functional configuration-diagram illustrative of a scene-of-interest extraction server constructed according to the present embodiment.

FIG. 4 is a functional configuration-diagram illustrative of the scene-of-interest extraction server 1 constructed according to the present embodiment.

Figure 5:
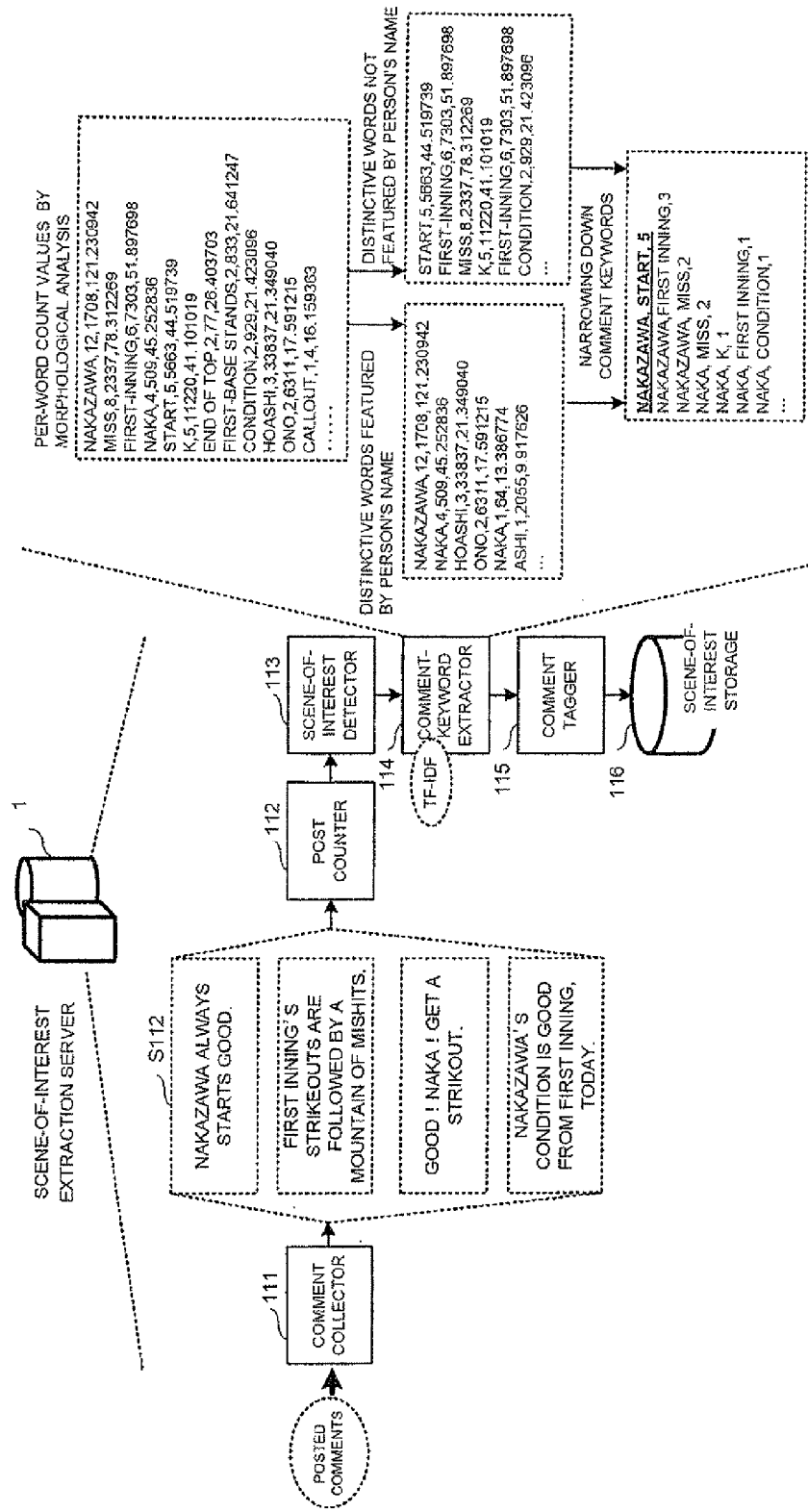
FIG. 5 is an illustrative view representing a flow of textual information in the case of FIG. 4.

FIG. 5 is an illustrative view representing a flow of textual information in the case of FIG. 4.

As illustrated in FIG. 4, the scene-of-interest extraction server 1 includes a communications interface 10 connected with the Internet; a comment collector 111; a post counter 112; a scene-of-interest detector 113; a comment-keyword extractor 114; a comment tagger 115; a scene-of-interest storage 116; and an abbreviated-content generator 117. These functional constituents are implemented by executing a predetermined program with a computer (a processor and a memory) built in the scene-of-interest extraction server 1. It is of course that these functional constituents may be implemented by executing the program with a computer (not shown) built in the terminal equipment 4 as illustrated in FIG. 4 in parentheses.

The comment collector 111 collects a plurality of comments with posting timestamps indicating times at which the comments were posted, from a comment server (e.g., a Twitter website server), wherein the comments contain keywords associated with the video content (in the similar manner with the above-described S111 of FIG. 2). As illustrated in FIG. 5, comments are collected, such as, for example, "NAKAZAWA always starts good . . . ," "The first inning's strikeouts are followed by a mountain of mishits," " . . . NAKA! Get a strikeout . . . ," " . . . NAKAZAWA . . . good from the first inning . . . . " Collected comments are delivered to the post counter 112.

The post counter 112 segments the video content into a plurality of scenes each having a predetermined time duration, and measures the number of ones of the plurality of comments, which were posted during a time zone of each scene, as a post count (in the similar manner with the above-described S112 of FIG. 2). As illustrated in the graph of FIG. 3, for example, posts are counted per each scene (e.g., at time intervals of 2 minutes), as post counts. The post counts are delivered to the scene-of-interest detector 113, per each scene.

The scene-of-interest detector 113 detects ones of the plurality of scenes, each of which has the post count equal to or larger than a predetermined number, as a plurality of scenes of interest (in the similar manner with the above-described S113 of FIG. 2). As illustrated in the graph of FIG. 3, for example, if each scene has the post count equal to or larger than a sum of the average μ and the standard deviation σ, the each scene is detected as a scene-of-interest. The detected scenes of interest are delivered to the comment-keyword extractor 114.

The comment-keyword extractor 114 extracts, per each scene-of-interest, at least one of the keywords which is contained in the plurality of comments with a number equal to or larger than a pre-selected number, as a comment keyword (in the similar manner with the above-described S114 of FIG. 2). As illustrated in FIG. 5, for one of the scenes of interest, per-word count values (which may be replaced with TF-IDF scores) obtained by the morphological analysis are specially depicted.

In an example depicted in FIG. 5, each of the per-word count values includes, per each word, a scene-specific frequency (i.e., how often each word appears in each scene), a total frequency, and a TF-IDF score, of each word.

In this implementation, the comment-keyword extractor 114 extracts a word that is featured by a part-of-speech of a "person's name" and has the higher TF-IDF score than a threshold, and a word that is not featured by a person's name and has the higher TF-IDF score than a threshold. Then, as illustrated in FIG. 5, the number of times that a word featured by the part-of-speech of the "person's name" and a word not featured by a person's name concurrently occur (i.e., co-occurrence frequency) is specially depicted. The comment-keyword extractor 114 delivers a set of words co-occurring the most frequently to the comment tagger 115.

In this example depicted in FIG. 5, a pair of "NAKA-ZAWA" and "START" is selected as the most frequent co-occurring pair, and is delivered to the comment tagger 115.

Further, in this example, first-step word extraction is performed for identifying one or more key characters or important persons, and then, second-step word extraction is performed for one or more key events or important events in association with the previously-identified one or more key characters, with improved extraction efficiency.

The comment tagger 115 tags each scene-of-interest with a comment keyword (in the similar manner with the above-described S115 of FIG. 2). The comment tagger 115 tags each scene-of-interest with a comment keyword in the form of a part-of-speech of a "person's name" and an important word, per each scene-of-interest.

The scene-of-interest storage 116 stores scenes of interest which have been tagged with comment keywords. The comment keywords are also used as search keys for searching for scenes of interest.

The abbreviated-content generator 117 generates abbreviated content of the video content by combining a sub-plurality of scenes of interest. The generated abbreviated content is stored in the scene-of-interest storage 116.

Figure 6:
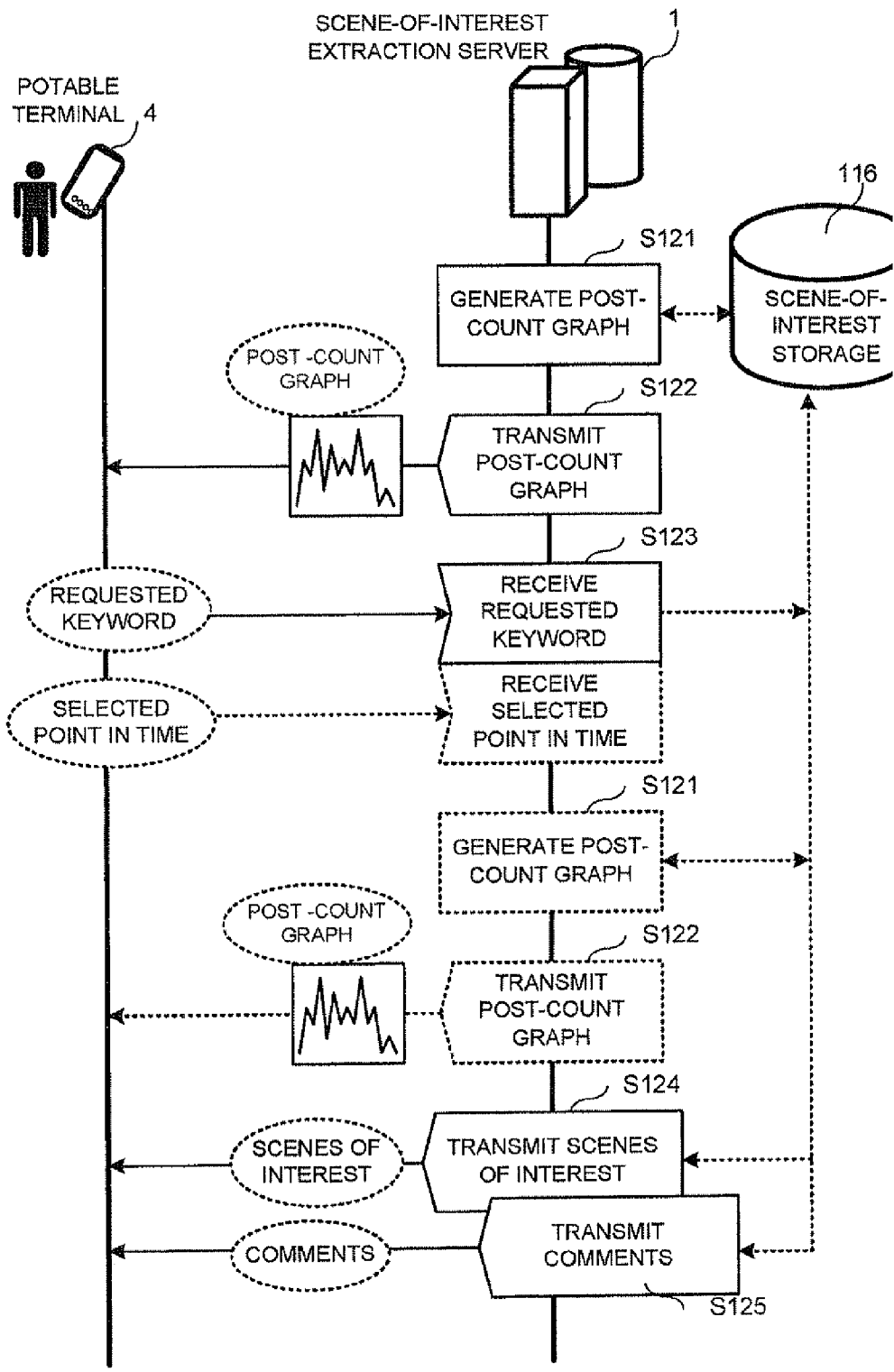
FIG. 6 is a sequence diagram of a system constructed according to an illustrative alternative embodiment of the invention.

FIG. 6 is a sequence diagram of a system constructed according to an illustrative alternative embodiment of the invention.

(S121) The scene-of-interest extraction server 1 generates a post-count graph representative of a time-varying number of the posts. The post-count graph is tagged with the comment keywords at selected points in time, by referencing the scene-of-interest storage 116.

Figure 7:
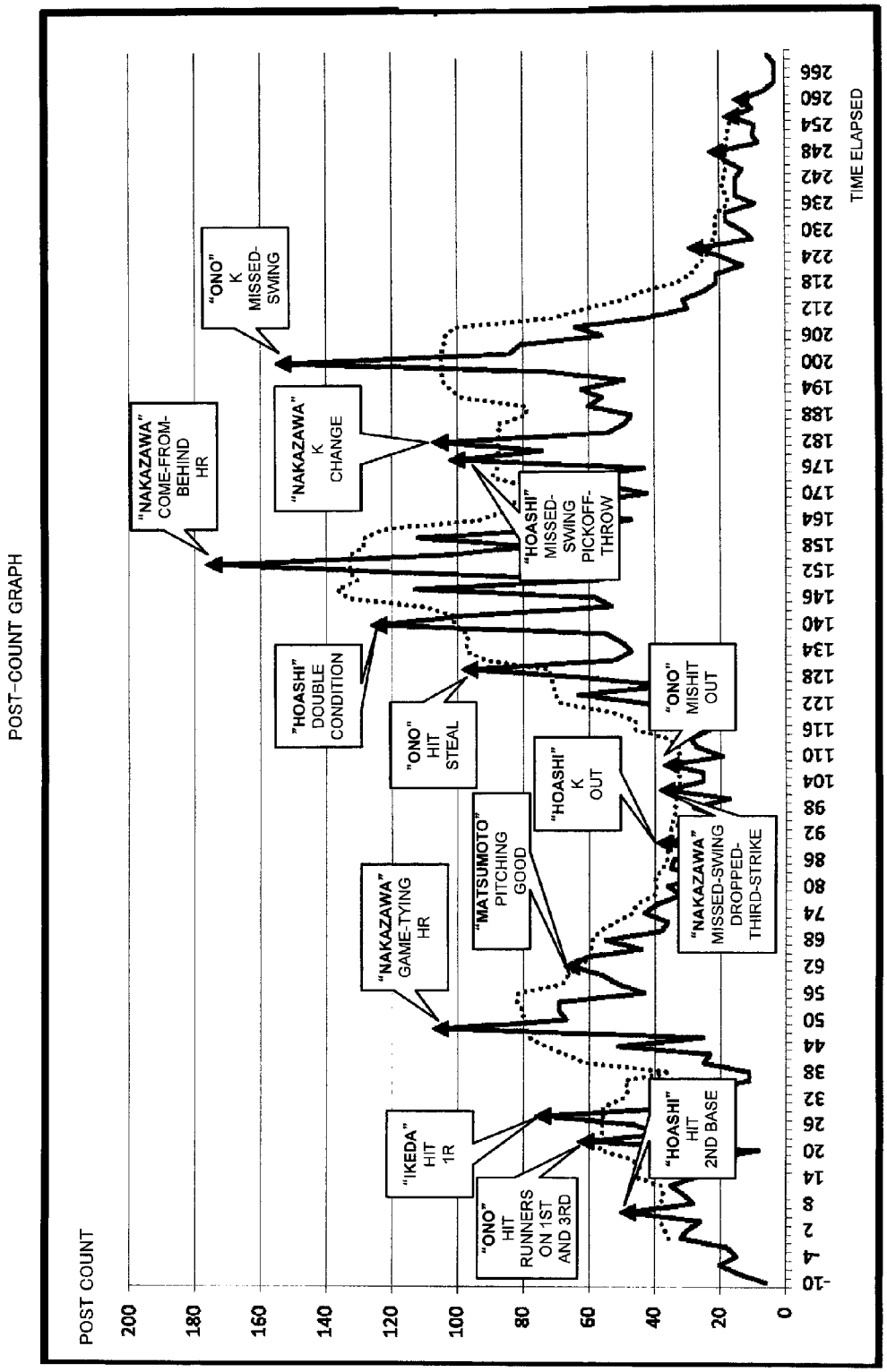
FIG. 7 is a post-count graph generated in the alternative embodiment.

FIG. 7 is a post-count graph generated in the alternative embodiment.

On the graph of FIG. 7, post counts are taken along the vertical axis, while points in time during a time lapse are taken along the horizontal axis. Further, per each of selected points in time, comment keywords that have been used for tagging are depicted. This post-count graph is generated to serve as information represented by an image, helping the user understand this graph directly through the image. Glancing at this post-count graph helps the user understand temporal changes in the post count even when the video content is relatively long. Further, it allows the user to learn major comment keywords in scenes of interest.

(S122) The scene-of-interest extraction server 1 transmits the generated post-count graph to the terminal equipment 4. On the display of the terminal equipment 4, the post-count graph is displayed.

Figure 8:
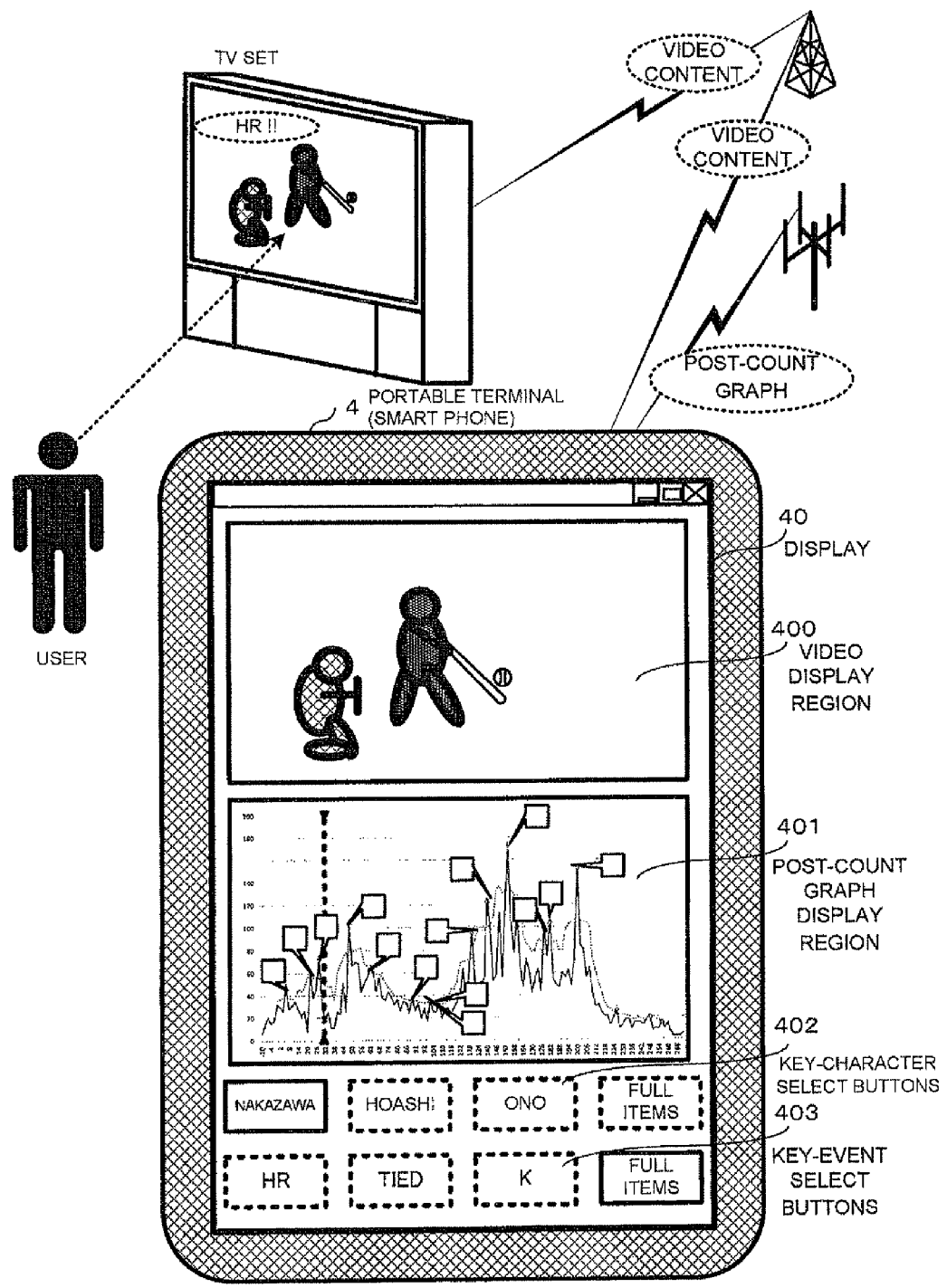
FIG. 8 is an illustrative view representing a post-count graph displayed on a display of terminal equipment.

FIG. 8 is an illustrative view representing a post-count graph displayed on the display 40 of the terminal equipment 4.

As illustrated in FIG. 8, on the display 40 of the terminal equipment 4 in the form of a smart phone, a video display region 400; a post-count graph display region 401; key-character select buttons 402; and key-event select buttons 403 are displayed. On the video display region 400, video content that has been received from the content publishing server 2 is played back. On the post-count graph display region 401, a post-count graph that has been received from the scene-of-interest extraction server 1 is displayed.

The key-character select buttons 402 and the key-event select buttons 403 are assigned keywords that appear relatively frequently in comment keywords attached to a post-count graph for tagging, and the user can select one of those eight buttons 402 and 403.

In an example depicted in FIG. 8, the terminal equipment 4 is configured to automatically select three key-character keywords and three key-event keywords from a group of comment keywords attached to a post-count graph for tagging, which appear more frequently than other keywords in the same group, and automatically assign the selected three key-character keywords and the selected three key-event keywords to the first three ones of the four key-character select buttons 402 and the first three ones of the four key-event select buttons 403, respectively.

In this example depicted in FIG. 8, the remaining one of the four key-character select buttons 402 is selected by the user to display on the display screen all the key characters contained in the group of comment keywords, and the remaining one of the four key-event select buttons 403 is selected by the user to display on the display screen all the event characters contained in the group of comment keywords.

The user's touch onto a desired one of the eight buttons 402 and 403 which has been assigned a desired keyword allows a scene of interest containing the keyword, to be played back, and also allows the user to visually conceive the number of comments associated with only the keyword.

(S123) It is presumed that the user touches one of the key-character select buttons 402 and the key-event select buttons 403, which are being displayed on the display 40 of the terminal equipment 4. The terminal equipment 4 transmits a keyword corresponding to the user-selected button 402 or 403, as a requested keyword, to the scene-of-interest extraction server 1. The scene-of-interest extraction server 1 retrieves scenes of interest associated with the requested keyword from the scene-of-interest storage 116.

It is added that, alternatively, as illustrated in FIG. 6 in dotted line, the user may view a post-count graph displayed on the terminal equipment 4, and enter a selected point in time. In this mode, the terminal equipment 4 transmits the selected point in time to the scene-of-interest extraction server 1. The scene-of-interest extraction server 1 retrieves one of the scenes of interest which is associated with the selected point in time, from the scene-of-interest storage 116.

In this stage, as illustrated in FIG. 6 in dotted line, S121 and S122 may be executed again. The scene-of-interest extraction server 1 may tag a post-count graph with only comment keywords containing the requested keyword. And the scene-of-interest extraction server 1 may generate a post-count graph representative of only the number of comments containing the requested keyword.

(S124) The scene-of-interest extraction server 1 transmits scenes of interest tagged with the requested keyword, to the terminal equipment 4.

(S125) Further, the scene-of-interest extraction server 1 transmits to the terminal equipment 4, comments posted in association with the scenes of interest tagged with the requested keyword, which have been received from the terminal equipment 4.

Figure 9:
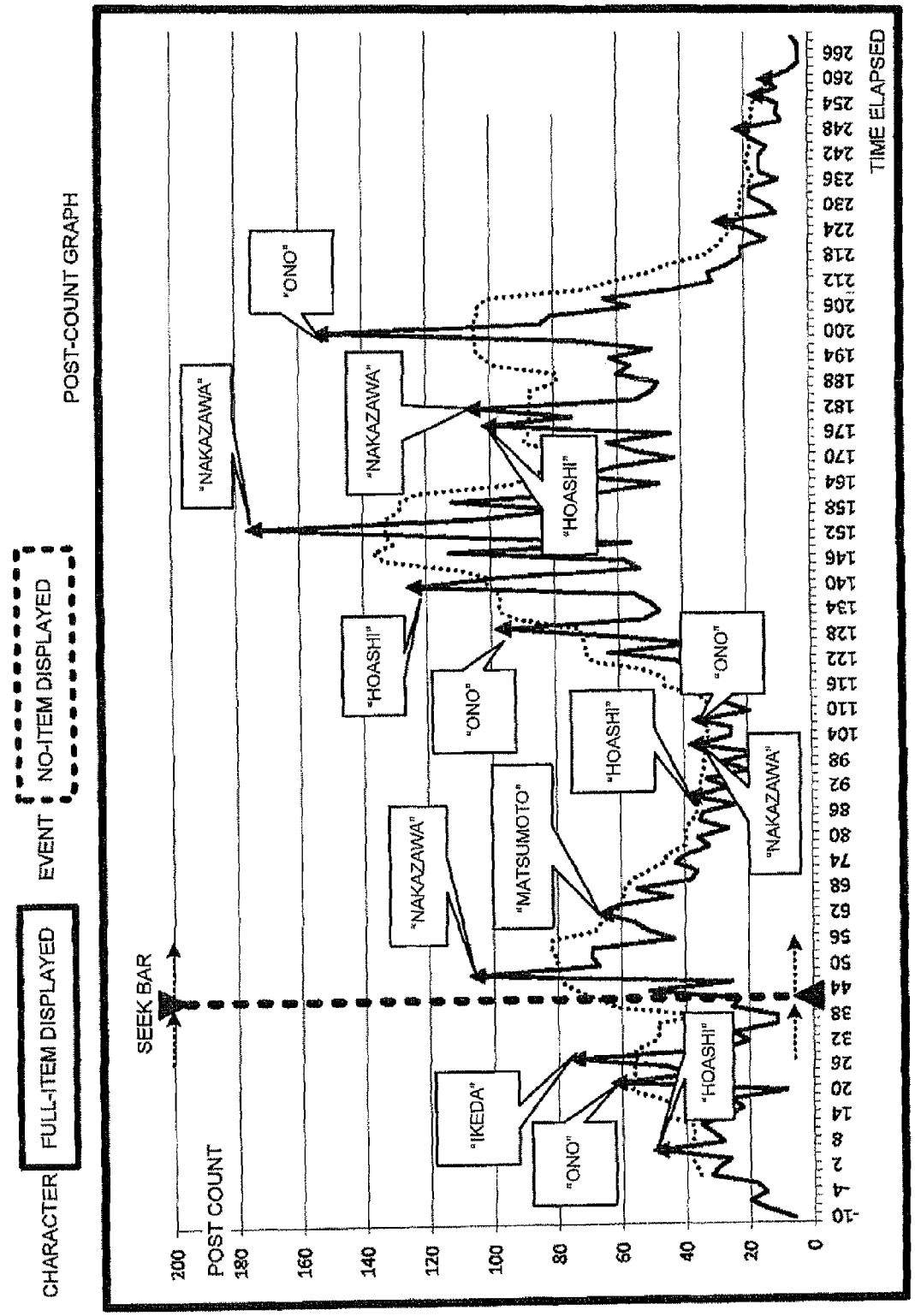
FIG. 9 is an illustrative view representing a post-count graph displayed on the display screen in response to reception of a request for displaying only character-related keywords.

FIG. 9 is an illustrative view representing a post-count graph displayed on the display screen in response to reception of a request for displaying only character-related keywords.

The post-count graph of FIG. 9 is displayed on the display 40 of the terminal equipment 4, when the user operates the terminal equipment 4 in the following manner:

"Key-character select button"="Full-item displayed," and
"Key-event select button"="No-item displayed."

As a result, the user can understand, at first sight, which one of scenes of interest many comments appear in, wherein each comment contains a keyword representative of a key "character" to who the user pays attention.

In addition, a seek bar is also displayed on the display screen, which moves as a time elapses while video content is being played back.

Figure 10:
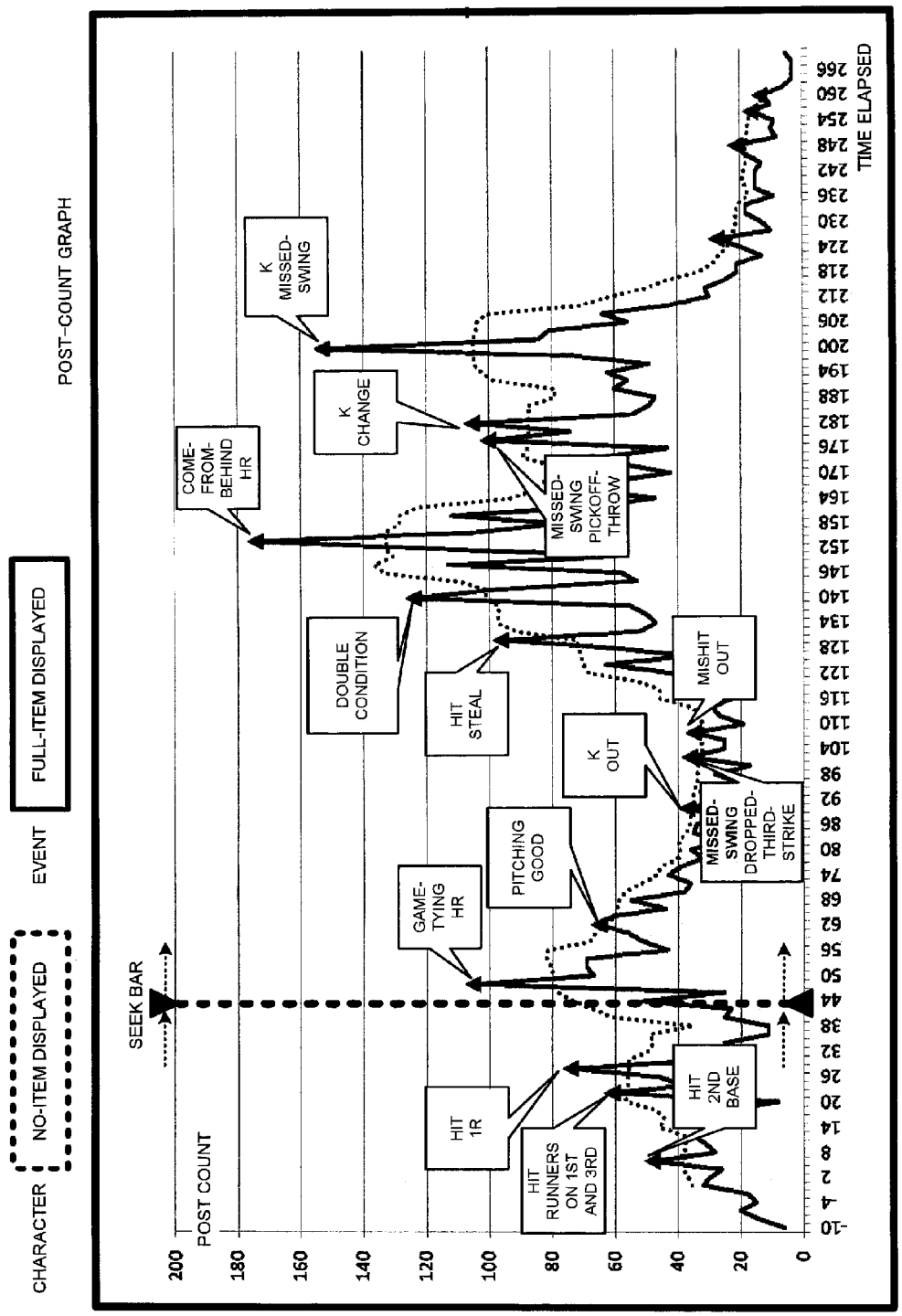
FIG. 10 is an illustrative view representing a post-count graph displayed on the display screen in response to reception of a request for displaying only event-related keywords.

FIG. 10 is an illustrative view representing a post-count graph displayed on the display screen in response to reception of a request for displaying only event-related keywords.

The post-count graph of FIG. 10 is displayed on the display 40 of the terminal equipment 4, when the user operates the terminal equipment 4 in the following manner:

"Key-character select button"="No-item displayed," and
"Key-event select button"="Full-item displayed."

As a result, the user can understand, at first sight, which one of scenes of interest many comments appear in, wherein each comment contains a keyword representative of a key "event" to who the user pays attention.

Figure 11:
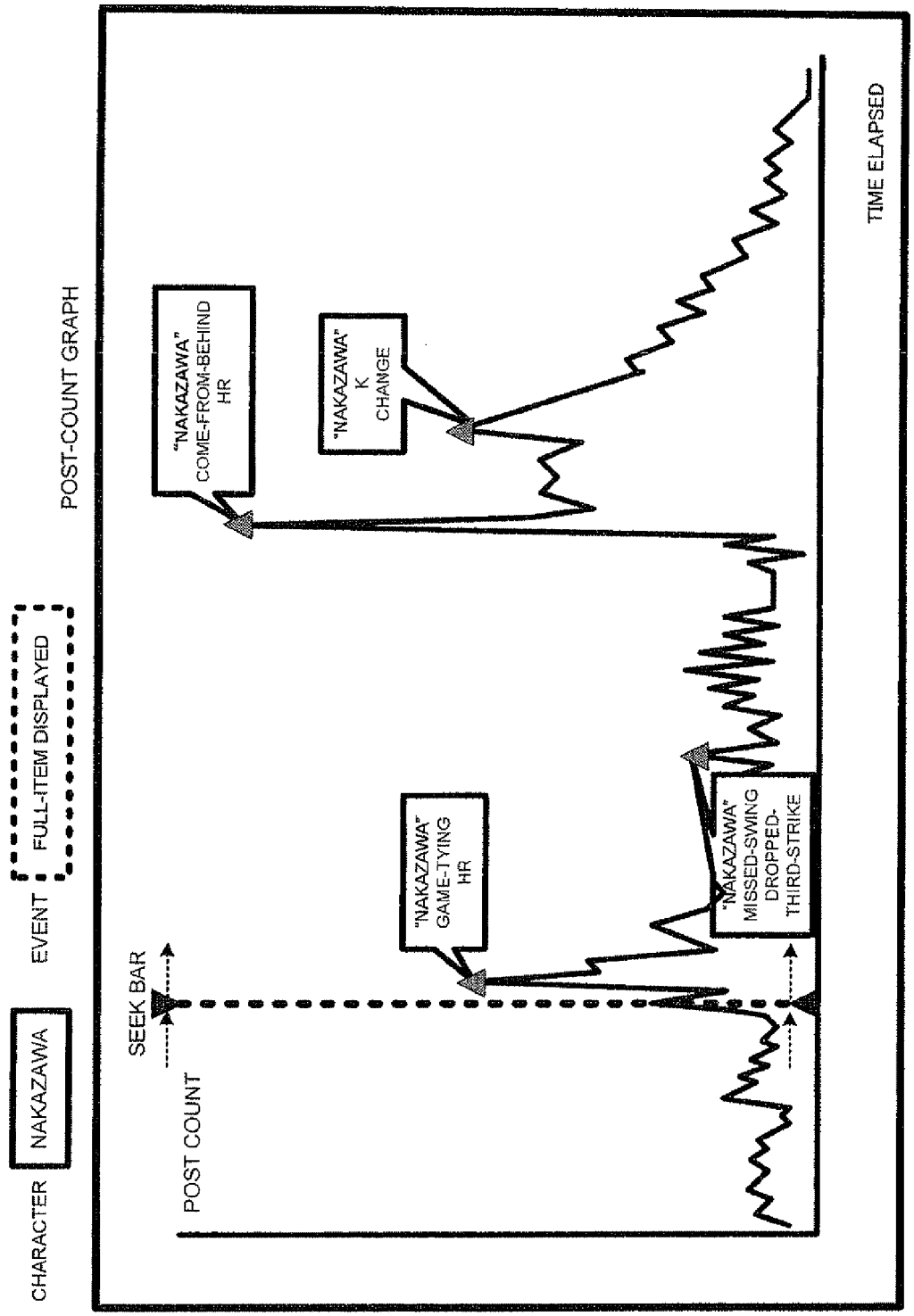
FIG. 11 is an illustrative view representing a post-count graph displayed on the display screen in response to reception of a request for displaying only a particular-character-related keyword.

FIG. 11 is an illustrative view representing a post-count graph displayed on the display screen in response to reception of a request for displaying only a particular-character-related keyword.

The post-count graph of FIG. 11 is displayed on the display 40 of the terminal equipment 4, when the user operates the terminal equipment 4 in the following manner:

"Key-character select button"="NAKAZAWA," and
"Key-event select button"="Full-item displayed."

Also for the post-counts, the numbers of comments containing "NAKAZAWA" as a keyword are displayed on the display screen at discrete points in time.

As a result, the user can understand, at first sight, which one of scenes of interest many comments appear in, wherein each comment contains a keyword representative of a "NAKAZAWA" to who the user pays attention.

Figure 12:
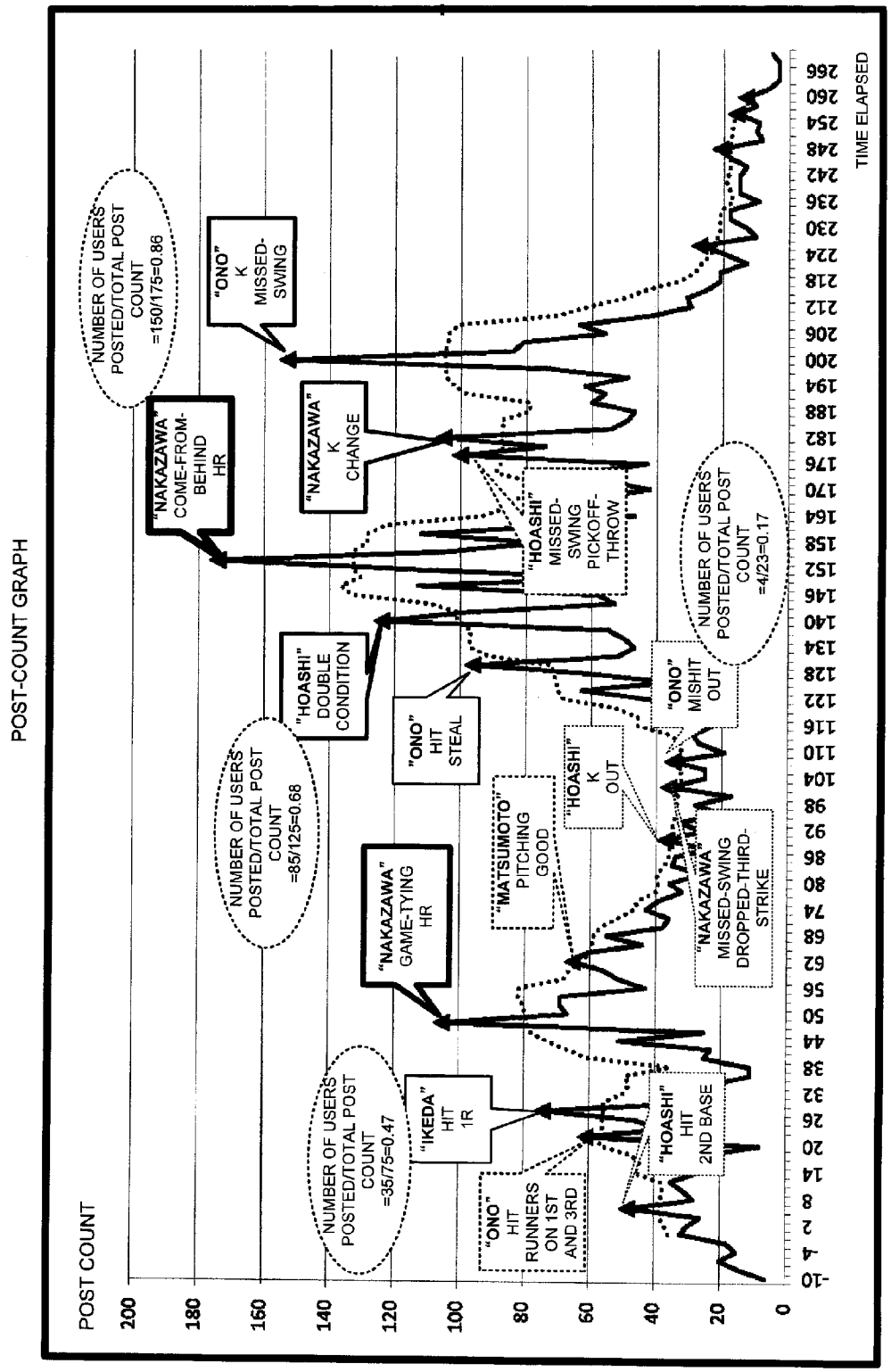
FIG. 12 is an illustrative view representing comment keywords displayed on the display screen such that each comment keyword is visually emphasized to an extent depending on a ratio of the number of users posted to the total number of posts.

FIG. 12 is an illustrative view representing comment keywords displayed on the display screen such that each comment keyword is visually emphasized to an extent depending on a ratio of the number of users posted to the total number of the posts.

As illustrated in the graph of FIG. 12, comment keywords that scenes of interest on the graph have been tagged with are displayed on the display screen such that the comment keywords are visually emphasized at different emphasis levels between the comment keywords. In this stage, for each scene of interest that has been tagged with a comment keyword on the graph, a ratio (i.e., posted-user-number/total-post-number) of the number of users who posted their comments to the total number of the posted comments in association with the each scene of interest is calculated. Then, each comment keyword is displayed on the display screen such that the each comment keyword is visually emphasized at an increasing emphasis level as the ratio of a scene of interest tagged with the each comment keyword increases. For example, the displaying is performed so that a label is collared conspicuously. As the ratio of the number of people who posted comments in association with a scene of interest increases, a comment keyword that the scene of interest is tagged with is displayed on the display screen with greater visual emphasis.

In an example, fifty comments (e.g., fifty tweets in the case of Twitter) were posted in association with a first scene-of-interest, while fifty users posted the comments (each user posted only one comment), and the ratio is 50/50=1. Further, fifty comments were posted in association with a second scene-of-interest, while twenty users posted the comments (each user posted 2.5 comments on the average), and the ratio is 20/50=0.4. In this example, a comment keyword for the first scene-of-interest is displayed on the display screen with greater visual emphasis than a comment keyword for the second scene-of-interest.

Figure 13:
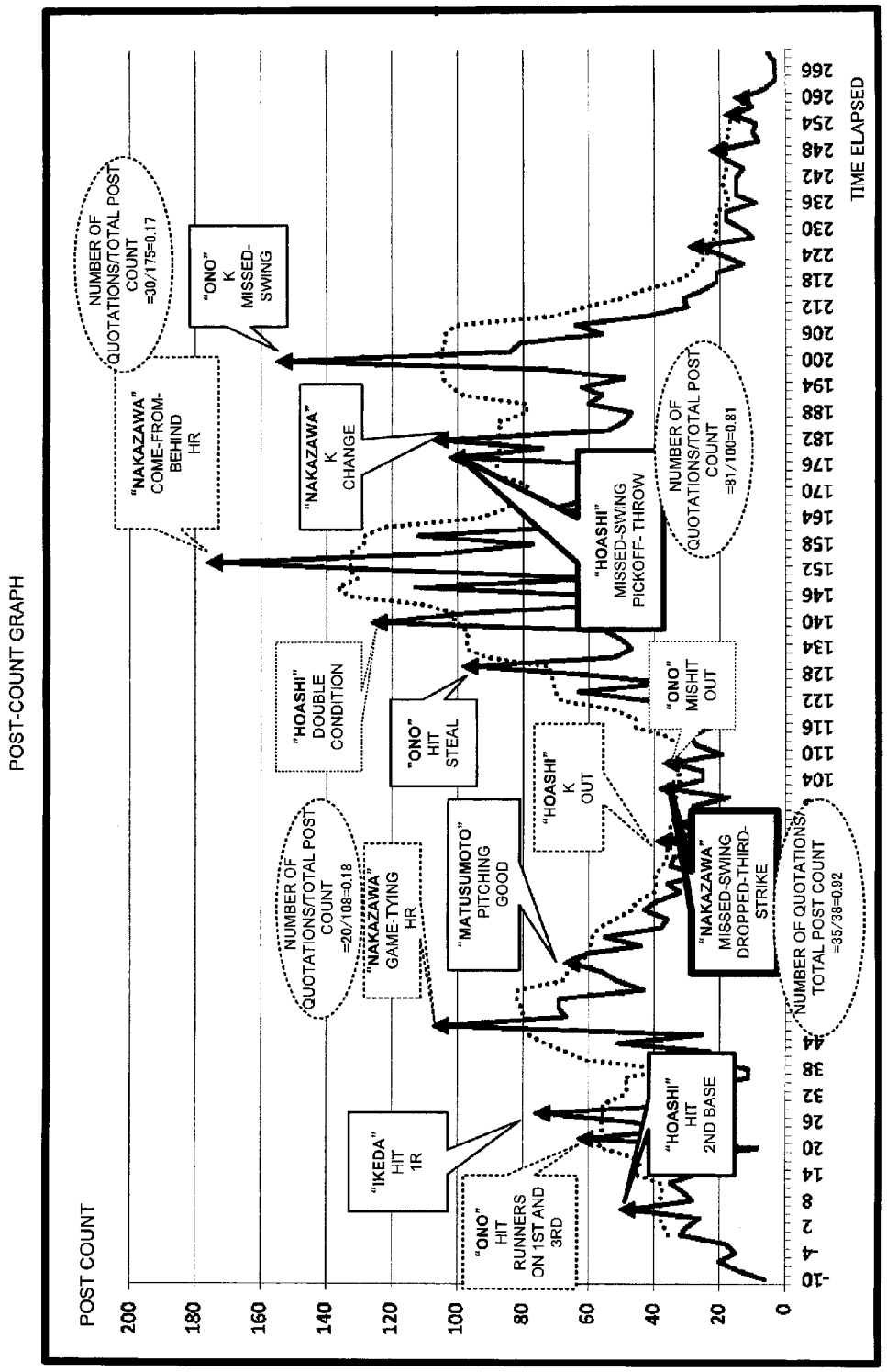
FIG. 13 is an illustrative view representing comment keywords displayed on the display screen such that each comment keyword is visually emphasized to an extent depending on a ratio of the number of quotations to the total number of posts.

FIG. 13 is an illustrative view representing comment keywords displayed on the display screen such that each comment keyword is visually emphasized to an extent depending on a ratio of the number of quotations to the total number of the posts.

As illustrated on the graph of FIG. 13, comment keywords that scenes of interest on the graph have been tagged with are displayed on the display screen such that the comment keywords are visually emphasized at different emphasis levels between the comment keywords. In this stage, for each scene of interest having been tagged with comment keywords on the graph, a ratio (i.e., quotation-number/total-post-number) of the number of ones of the posts which have been made by post quotation to the total number of the posted comments in association with the each scene of interest is calculated. Then, each comment keyword is displayed such that the each comment keyword is visually emphasized at an increasing emphasis level as the ratio of a scene of interest tagged with the each comment keyword increases. For example, the displaying is performed so that a label is collared conspicuously.

The "post quotation" is referred to, for example, ReTweet in the case of Twitter. ReTweet is referred to incorporation of others' posted comments (i.e., Tweets) into my comment by quotation or reference. A comment keyword is displayed on the display screen with visual emphasis when a scene of interest has a comment made by many quotations, and when the scene of interest has been tagged with the comment keyword.

In an example, fifty comments (e.g., fifty tweets in the case of Twitter) were posted in association with a first scene-of-interest, while twenty ones of the associated comments are made by quotation, and the ratio is 20/50=0.4. Further, fifty comments were posted in association with a second scene-of-interest, while ten ones of the associated comments are made by quotation, and the ratio is 10/50=0.2. In this example, a comment keyword for the first scene-of-interest is displayed on the display screen with greater visual emphasis than a comment keyword for the second scene-of-interest.

Figure 14:
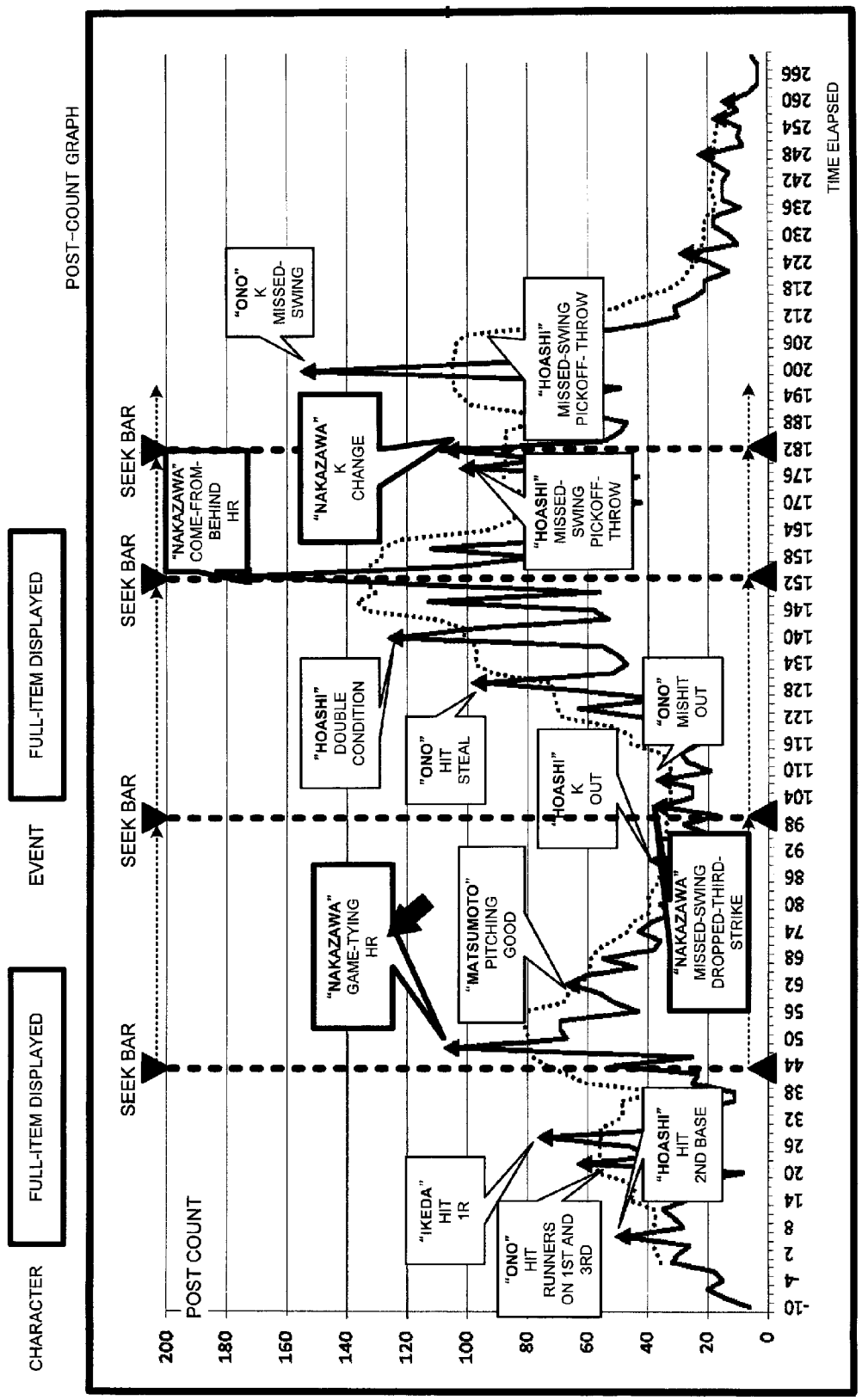
FIG. 14 is an illustrative view representing a post-count graph displayed on the display screen such that a jump is made to one of scenes of interest which is associated only with a user-selected character-related-keyword.

FIG. 14 is an illustrative view representing a post-count graph displayed on the display screen such that a jump is made to one of scenes of interest which is associated only with a user-selected character-related-keyword.

The post-count graph of FIG. 14 is displayed on the display 40 of the terminal equipment 4, when the user operates the terminal equipment 4 in the following manner:

"Key-character select button"="Full-item displayed," and
"Key-event select button" "Full-item displayed."

Then, it is presumed that the user designates one of the displayed keywords. The designation may be a click event via a pointing device or a long press event. This allows the seek bar to jump to a scene of interest having the designated keyword.

The user can start viewing a scene of interest containing the user-designated keyword soon.

Figure 15:
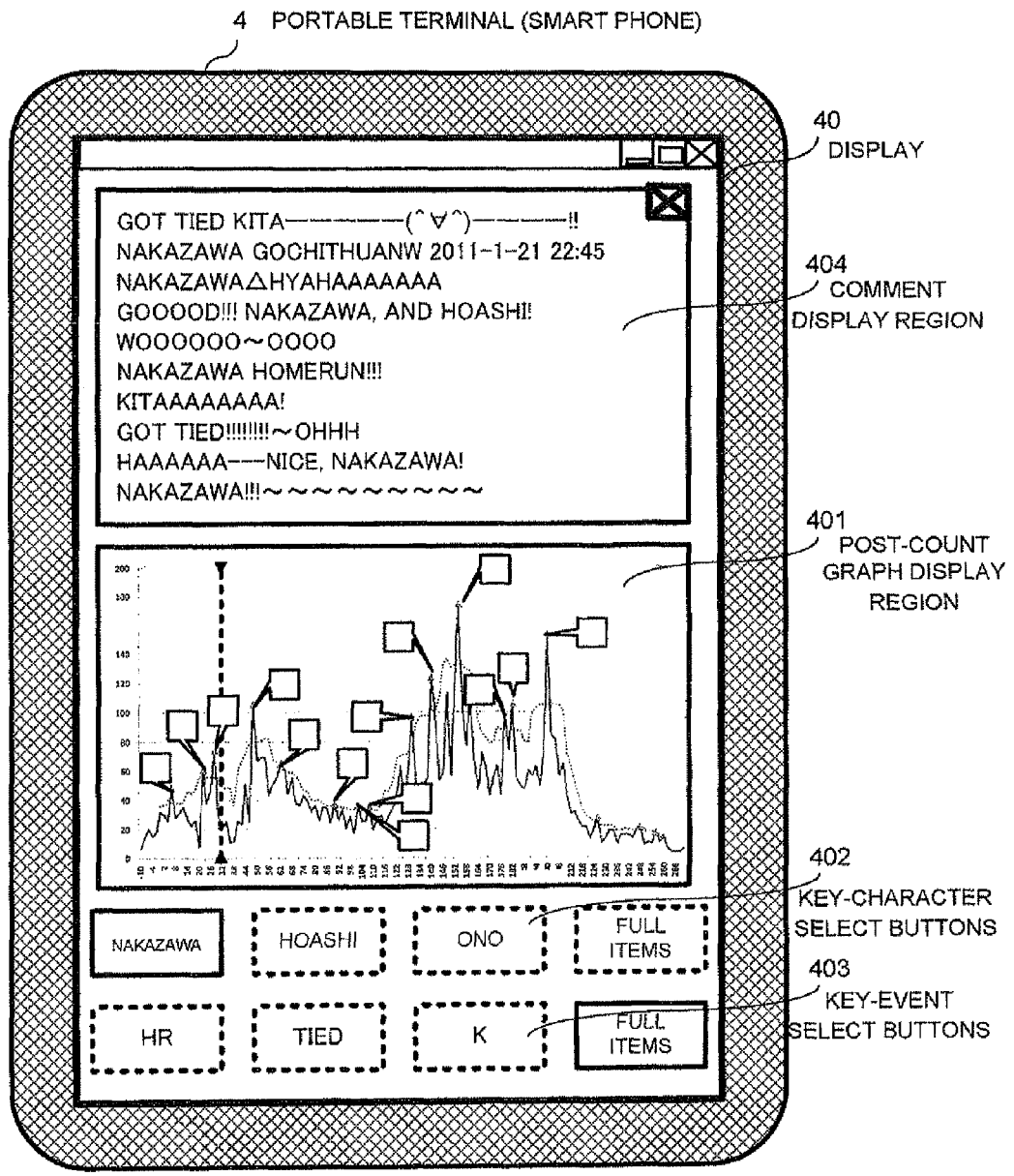
FIG. 15 is an illustrative view representing comments displayed on the display of the terminal equipment.

FIG. 15 is an illustrative view representing comments displayed on the display 40 of the terminal equipment 4.

As illustrated in FIG. 15, comments are displayed on the video display region 400 of the display 40 of the terminal equipment 4. For example, tweets are displayed in the case of Twitter. This allows the user to view the posted comments.

Figure 16:
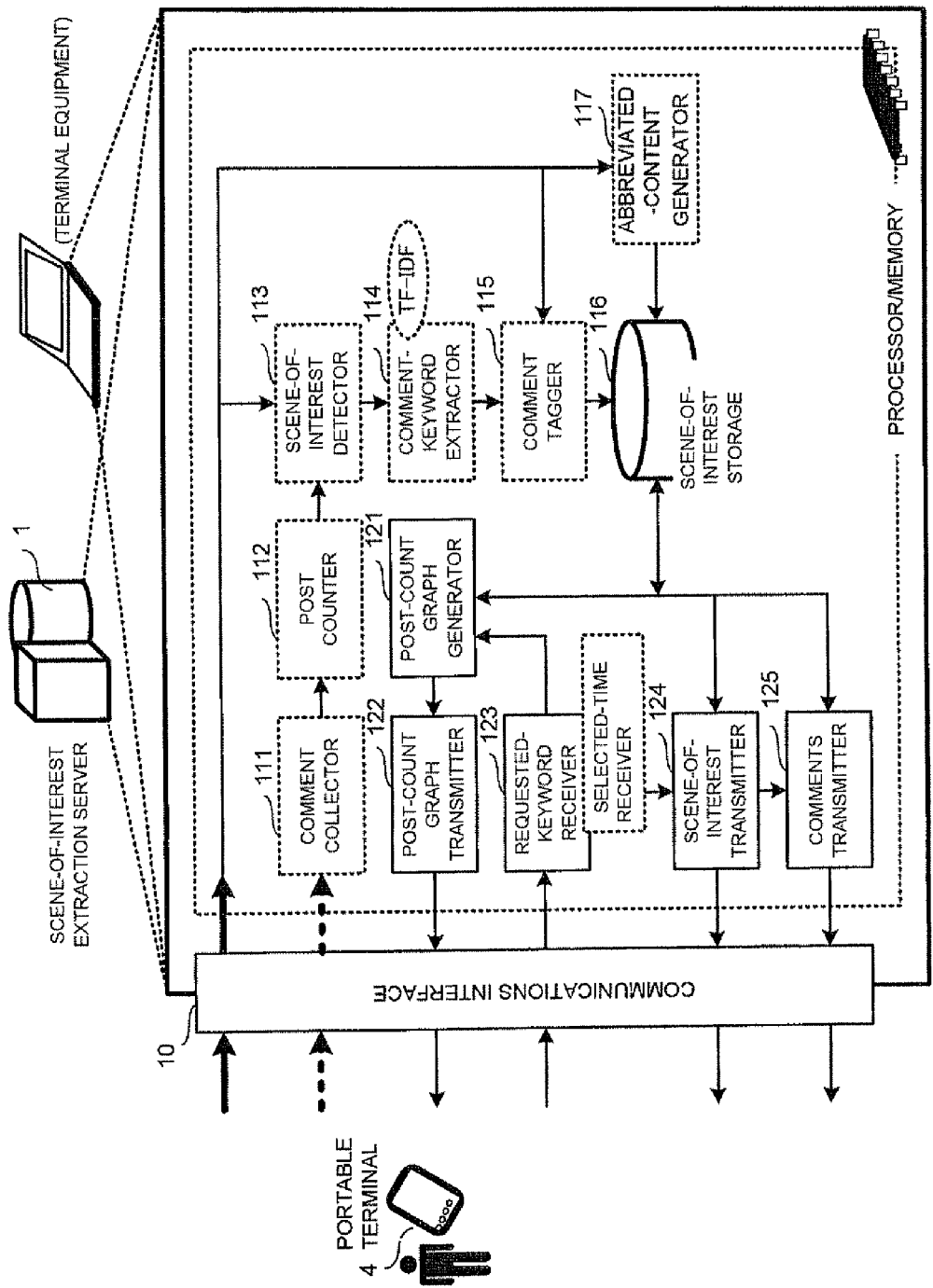
FIG. 16 is a functional configuration-diagram illustrative of a scene-of-interest extraction server implementing the sequence of FIG. 6.

FIG. 16 is a functional configuration-diagram illustrative of the scene-of-interest extraction server 1 implementing the sequence of FIG. 6.

As illustrated in FIG. 16, the scene-of-interest extraction server 1 includes, in addition to the functional constituents depicted in FIG. 4, a post-count graph generator 121; a post-count graph transmitter 122; a requested-keyword receiver 123; a scene-of-interest transmitter 124, and a comments transmitter 125. These functional constituents are implemented by executing a predetermined program with the computer built in the scene-of-interest extraction server 1.

The post-count graph generator 121 generates a post-count graph that is representative of a time-varying post-count, and that is tagged with comment keywords at selected points in time by referencing the scene-of-interest storage 116 (see the above-described S121 of FIG. 6). In this regard, the post-count graph generator 121 may tag the post-count graph with only comment keywords containing a requested keyword. And, the post-count graph generator 121 may generate a post-count graph representative of only the number of comments containing a requested keyword. The generated post-count graph is transmitted to the post-count graph transmitter 122.

The post-count graph transmitter 122 transmits the post-count graph to the terminal equipment 4 (see the above-described S122 of FIG. 6).

The requested-keyword receiver 123 receives a requested keyword from the terminal equipment 4 (see the above-described S123 of FIG. 6). The requested keyword is delivered to the post-count graph generator 121 and the scene-of-interest transmitter 124. It is noted that the requested-keyword receiver 123 may receive a selected point in time from the terminal equipment 4. This is a time at which a scene of interest is played back according to a request from the user through the terminal equipment 4. The selected point in time at which a scene of interest is played back according to a request is delivered to the scene-of-interest transmitter 124.

The scene-of-interest transmitter 124 transmits to the terminal equipment 4, only scenes of interest tagged with a requested keyword, by referencing the scene-of-interest storage 116 (see the above-described S124 of FIG. 6). The scene-of-interest transmitter 124 also transmits a scene of interest associated with a selected point in time, to the terminal equipment 4.

The comments transmitter 125 transmits to the terminal equipment 4, comments associated with scenes of interest tagged with a requested keyword received from the terminal equipment 4, by referencing the scene-of-interest storage 116 (see the above-described S125 of FIG. 6).

As described above in detail, the present embodiment allows extraction of scenes of interest (exciting scenes) from video content being broadcast sequentially, by referencing the number of comments (e.g., twitters) that have been posted (e.g., the number of tweets attached with a hash tag), from a user's viewpoint, and allows tagging of the scenes of interest with their comment keywords. Each comment keyword is comprised of a person's name and an important word. The user can view a scene of interest together with a keyword that briefly indicates the content of the scene of interest, promoting the user's understanding of the scene of interest. The use of a comment keyword that scenes of interest are tagged with to serve as a keyword tag, enables the user to search for scenes of interest, to thereby allow the user to view various scenes of interest.

Additionally, the user can learn through the post-count graph, when each scene of interest appears, within the full time length of video content, and the user can view only scenes of interest associated with the user-designated desired keyword.

Although the embodiments have been described above, with comments written in Japanese language, the invention may be practiced when comments are written in English language or other languages (e.g., Chinese language, Korean language, or German language).

However, for analyzing comments written in language such as English language in which word boundaries are indicated by blank spaces, without any need for word segmentation, the invention may be practiced by completely or partially abbreviating the whole process of the above-described Morphological Analysis.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

The present specification provides a complete description of the methodologies, systems and/or structures and uses in exemplary implementations of the presently-described technology. Although various implementations of this technology have been described above with a certain degree of particularity, or with reference to one or more individual implementations, those skilled in the art could make numerous alterations to the disclosed implementations without departing from the spirit or scope of the technology thereof. Furthermore, it should be understood that any operations may be performed in any order, unless explicitly claimed otherwise or a specific order is inherently necessitated by the claim language. It is intended that all matter contained in the above description and shown in the accompanying drawings shall be interpreted as illustrative only of particular implementations and are not limiting to the embodiments shown. Changes in detail or structure may be made without departing from the basic elements of the present technology as defined in the following claims.

What is claimed is:

1. A method of extracting scenes of interest from video content, the method comprising:
   collecting a plurality of comments with posting timestamps indicating times at which the comments were posted, from a comment server, the comments containing keywords associated with the video content;
   segmenting the video content into a plurality of scenes;
   measuring a number of ones of the plurality of comments which were posted during a time zone of each scene, as a post count;

calculating an average μ post count per scene and a standard deviation σ of the post counts among each of the scenes;

detecting ones of the plurality of scenes having a post count equal to or larger than a sum of the average μ and the standard deviation σ as a plurality of scenes of interest; and for each of the scenes of interest:
extracting at least one of the keywords which is contained in the plurality of comments with a number equal to or larger than a pre-selected number, as a comment keyword; and
tagging the scene of interest with the comment keyword.

2. The method according to claim 1, further comprising generating abbreviated content representative of an abbreviated version of the video content, by combining at least two of the scenes of interest.

3. The method according to claim 1, wherein the comment-keyword extraction operation for each of the scenes of interest comprises extracting candidate words from the plurality of comments, and extracting distinctive words as the comment keyword from the candidate words based on word frequencies.

4. The method according to claim 3,
wherein the comment-keyword extraction operation for each of the scenes of interest comprises:
extracting "persons' names" from the distinctive words; and
extracting an important word having a word frequency equal to or larger than a predetermined value, from the distinctive words; and
the comment-tagging operation for each of the scenes of interest comprises tagging each scene-of-interest with the comment keyword in the form of the part-of-speech of the "person's name" and the important word.

5. The method according to claim 1, further comprising:
generating a post-count graph representative of a time-varying number of the posts, such that the post-count graph is tagged with the comment keywords at selected points in time; and
transmitting the post-count graph to a viewer's terminal equipment allowing the viewer to view the video content.

6. The method according to claim 5, further comprising transmitting to the terminal equipment ones of the scenes of interest which are tagged with the requested keyword.

7. The method according to claim 5, further comprising transmitting to the terminal equipment ones of the plurality of comments which correspond to ones of the scenes of interest which are tagged with the requested keyword received from the terminal equipment.

8. The method according to claim 5, wherein the post-count graph generation operation comprises:
calculating a ratio of a number of users who posted the plurality of comments, to a total number of the plurality of comments, for ones of the scenes of interest which are tagged with the comment keywords on the post-count graph; and
displaying the comment keywords with which the scenes of interest are tagged, such that each comment keyword is visually emphasized at an increasing emphasis level as the ratio of the associated one of the tagged scenes of interest increases.

9. The method according to claim 5, wherein the post-count graph generation operation comprises:
calculating a ratio of a number of ones of the plurality comments which have quotation, to a total number of the plurality of comments, for ones of the scenes of interest which are tagged with the comment keywords on the post-count graph; and
displaying the comment keywords with which the scenes of interest are tagged, such that each comment keyword is visually emphasized at an increasing emphasis level as the ratio of the associated one of the tagged scenes of interest increases.

10. The method according to claim 5, wherein the video content includes at least one of TV broadcast content and content from a video sharing website, and the comment server includes a mini blog (mini Web log) server.

11. The method according to claim 10, wherein the mini blog server is a Twitter (Registered Trademark) server, and the comment collection operation comprises collecting the plurality of comments containing hash tags based on the video content, from the Twitter server.

12. The method according to claim 5, further comprising receiving a requested keyword from the terminal equipment, wherein the post-count graph generation operation comprises tagging the post-count graph with ones of the comment keywords which contain the requested keyword.

13. The method according to claim 12, wherein the post-count graph generation operation comprises generating a post-count graph representative of numbers of ones of the plurality of comments which contain the requested keyword.

14. A non-transitory storage medium having stored a computer program, when executed by a computer, for implementing the method according to claim 1.

15. A server of extracting scenes of interest from video content, comprising:
a collector that collects a plurality of comments with posting timestamps indicating times at which the comments were posted, from a comment server, the comments containing keywords associated with the video content;
a post counter that segments the video content into a plurality of scenes, and measures a number of ones of the plurality of comments which were posted during a time zone of each scene, as a post count;
a scene-of-interest detector that calculates an average μ post count per scene and a standard deviation σ of the post counts among each of the scenes, and detects ones of the plurality of scenes having a post count equal to or larger than a sum of the average μ and the standard deviation σ as a plurality of scenes of interest;
a comment-keyword extractor that extracts, for each of the scenes of interest, at least one of the keywords which is contained in the plurality of comments with a number equal to or larger than a pre-selected number, as a comment keyword;
a comment tagger that tags each scene of interest with the comment keyword; and
a scene-of-interest delivery unit that delivers the tagged scenes of interest, upon reception of a request from a viewer's terminal equipment allowing the viewer to view the video content.

16. Terminal equipment in connection with a network, comprising:
a video-content receiver that receives video content to be published;
a collector collects a plurality of comments with posting timestamps indicating times at which the comments were posted, from a comment server, the comments containing keywords associated with the video content;
a post counter that segments the video content into a plurality of scenes, and measures a number of ones of the plurality of comments which were posted during a time zone of each scene, as a post count;

a scene-of-interest detector that calculates an average μ post count per scene and a standard deviation σ of the post counts among each of the scenes, and detects ones of the plurality of scenes having a post count equal to or larger than a stun of the average μ and the standard deviation σ, as a plurality of scenes of interest;

a comment-keyword extractor that extracts at least one of the keywords which is contained in the plurality of comments with a number equal to or larger than a pre-selected number, as a comment keyword; and a comment tagger that tags each scene of interest with the comment keyword, for each of the scenes of interest.

17. A method of extracting scenes of interest from video content, the method comprising:

collecting a plurality of comments with posting timestamps indicating times at which the comments were posted, from a comment server, the comments containing keywords associated with the video content;

segmenting the video content into a plurality of scenes;

measuring a number of ones of the plurality of comments which were posted during a time zone of each scene, as a post count;

detecting ones of the plurality of scenes, each of which has a post count equal to or larger than a predetermined number, as a plurality of scenes of interest;

for each of the scenes of interest:
   extracting at least one of the keywords which is contained in the plurality of comments with a number equal to or larger than a pre-selected number, as a comment keyword; and
   tagging the scene of interest with the comment keyword;

generating a post-count graph representative of a time-varying number of the posts, such that the post-count graph is tagged with the comment keywords at selected points in time; and transmitting the post-count graph to a viewer's terminal equipment allowing the viewer to view the video content.

18. A non-transitory storage medium having stored a computer program, when executed by a computer, for implementing the method according to claim 17.

* * * * *